(12) United States Patent
Schnitzer et al.

(10) Patent No.: US 10,608,897 B2
(45) Date of Patent: Mar. 31, 2020

(54) BROADBAND PROFILE MANAGEMENT

(71) Applicant: Applied Broadband, Inc., Boulder, CO (US)

(72) Inventors: Jason K. Schnitzer, Boulder, CO (US); Daniel Rice, Boulder, CO (US); David Early, Louisville, CO (US)

(73) Assignee: Applied Broadband Inc., Boulder, CO (US)

( * ) Notice: Subject to any disclaimer, the term of this patent is extended or adjusted under 35 U.S.C. 154(b) by 370 days.

(21) Appl. No.: 15/809,646

(22) Filed: Nov. 10, 2017

(65) Prior Publication Data
US 2018/0131582 A1  May 10, 2018

Related U.S. Application Data

(60) Provisional application No. 62/420,420, filed on Nov. 10, 2016.

(51) Int. Cl.
*H04L 12/24*  (2006.01)
*H04L 12/18*  (2006.01)
(Continued)

(52) U.S. Cl.
CPC ........ *H04L 41/5009* (2013.01); *H04L 12/185* (2013.01); *H04L 12/2861* (2013.01);
(Continued)

(58) Field of Classification Search
CPC . H04L 41/12; H04L 41/5009; H04L 41/5038; H04L 41/0823; H04L 12/185;
(Continued)

(56) References Cited

U.S. PATENT DOCUMENTS 7,542,411 B1 *  6/2009  Goh .................... H04L 27/2607
                                                       370/208
8,284,690 B2 * 10/2012  Barr .................... H04L 12/2801
                                                       370/252
(Continued)

OTHER PUBLICATIONS

Sunderisan, et al., "Applications of Machine Learning in Cable Access Networks", "Spring Technical Forum Proceedings", May 16, 2016, p. 17, Publisher: https://www.nctatechnicalpapers.com/Paper/2016/2016-applications-of-machine-learning-in-cable-access-networks, Published in: US.
(Continued)

*Primary Examiner* — James M Perez
(74) *Attorney, Agent, or Firm* — Neugeboren O'Dowd PC

(57) ABSTRACT

Systems and methods for performing broadband profile management in a cable network are disclosed. The method may include establishing a network connection with a cable modem termination System (CMTS) and discovering OFDM channels utilized by the cable network where each of the OFDM channels includes a plurality of OFDM subcarriers. In addition, a current set of profiles for the cable network is discovered and each of the profiles defines a modulation order for each of the plurality of OFDM subcarriers in each OFDM channel. Signal quality values are obtained for the plurality of OFDM subcarriers to generate a mapping between the signal quality values and the OFDM subcarriers, and a plurality of profiles are generated based upon the mapping between the signal quality values and the OFDM subcarriers. Then each of the cable modems is assigned to one of the plurality of profiles.

31 Claims, 12 Drawing Sheets

(51) Int. Cl.
*H04L 12/28* (2006.01)
*H04L 12/70* (2013.01)

(52) U.S. Cl.
CPC ...... *H04L 12/2869* (2013.01); *H04L 41/0823* (2013.01); *H04L 41/12* (2013.01); *H04L 41/5038* (2013.01); *H04L 12/2801* (2013.01); *H04L 2012/5605* (2013.01); *H04L 2012/5615* (2013.01); *H04L 2012/5626* (2013.01)

(58) Field of Classification Search
CPC ............. H04L 12/2801; H04L 12/2861; H04L 12/2869; H04L 2012/5626; H04L 2012/5605; H04L 2012/5615
See application file for complete search history.

(56) References Cited

U.S. PATENT DOCUMENTS

| | | | | |
|---|---|---|---|---|
| 8,549,224 | B1* | 10/2013 | Zeryck | G06F 3/061 711/114 |
| 8,621,539 | B1* | 12/2013 | Monk | H04L 12/2801 725/111 |
| 8,935,389 | B2* | 1/2015 | Pedigo | H04L 43/12 709/208 |
| 9,025,954 | B2* | 5/2015 | Fang | H04L 12/2801 398/66 |
| 9,596,622 | B2* | 3/2017 | Tian | H04W 28/08 |
| 9,660,774 | B2* | 5/2017 | Jin | H04L 5/0007 |
| 9,692,564 | B2* | 6/2017 | Chapman | H04L 5/0007 |
| 9,762,377 | B2* | 9/2017 | Hamzeh | H04N 21/6118 |
| 10,148,408 | B2* | 12/2018 | Hamzeh | H04L 5/0078 |
| 10,432,388 | B2* | 10/2019 | Hamzeh | H04B 3/487 |
| 2010/0150016 | A1* | 6/2010 | Barr | H04L 12/2801 370/252 |
| 2013/0236185 | A1* | 9/2013 | Fang | H04L 41/12 398/115 |
| 2015/0188668 | A1* | 7/2015 | Al-banna | H04L 5/0044 370/208 |
| 2015/0223114 | A1* | 8/2015 | Tian | H04W 28/08 370/235 |
| 2015/0295684 | A1* | 10/2015 | Jin | H04L 5/0007 370/390 |
| 2017/0093555 | A1* | 3/2017 | Hamzeh | H04N 21/6118 |
| 2017/0141887 | A1* | 5/2017 | Garcia | H04L 5/006 |
| 2017/0188266 | A1* | 6/2017 | Tian | H04W 28/08 |
| 2017/0373820 | A1* | 12/2017 | Hamzeh | H04N 21/6118 |
| 2018/0102868 | A1* | 4/2018 | Sundaresan | H04L 41/0893 |
| 2019/0068354 | A1* | 2/2019 | Hamzeh | H04N 21/6118 |
| 2019/0182125 | A1* | 6/2019 | Neisinger | H04L 43/0876 |
| 2019/0305876 | A1* | 10/2019 | Sundaresan | H04L 43/045 |
| 2019/0387293 | A1* | 12/2019 | Hajduczenia | H04Q 11/0067 |
| 2019/0394015 | A1* | 12/2019 | Hamzeh | H04L 12/2885 |

OTHER PUBLICATIONS

Rahman, et al., "DOCSIS 3.1 Overdrive: Dynamic Optimization Using a Programmable Physical Layer", "Spring Technical Forum Proceedings", May 16, 2016, p. 12, Publisher: NCTA, Published in: US.

Cable Television Laboratories, Inc., "Data-Over-Cable Service Interface Specifications, DOCSIS 3.1 CCAP Operations Support System Interface Specification, CM-SP-CCAP-OSSIV3.1-I11-171220", Dec. 20, 2017, p. 696, Publisher: https://apps.cablelabs.com/specification/CM-SP-CCAP-OSSIv3.1, Published in: US.

Cable Television Laboratories, Inc., "Data-Over-Cable Service Interface Specifications, DOCSIS 3.1 CM Operations Support System Interface Specification, CM-SP-CCAP-OSSIV3.1-I11-171220", Dec. 20, 2017, p. 297, Publisher: https://apps.cablelabs.com/specification/CM-SP-CM-OSSIv3.1, Published in: US.

Cable Television Laboratories, Inc., "Data-Over-Cable Service Interface Specifications, DOCSIS3.1 Physical Layer Specification, CM-SP-PHYV3.1-I13-201217", Dec. 20, 2017, p. 295, Publisher: https://apps.cablelabs.com/specification/CM-SP-PHYv3.1, Published in: US.

White, et al., "DOCSIS 3.1 Profile Management Application and Algorithms", "2016 Spring Technical Forum Proceedings", May 16, 2016, p. 11, Publisher: NCTA, Published in: US.

Cable Television Laboratories, Inc., "Data-Over-Cable Service Interface Specifications, DOCSIS 3.1 MAC and Upper Layer Protocols Interface Specification, CM-SP-MULPI-V3.1-I14-013018", Jan. 30, 2018, p. 901, Publisher: https://apps.cablelabs.com/specification/CM-SP-MULPIv3.1, Published in: US.

Jackisch, et al., "A Software Defined Radio Based DOCSIS 3.1 Measurement Receiver", "2016 International Conference on Consumer Electronics—Berlin", Sep. 5, 2016, p. 5, Publisher: IEEE, Published in: Berlin, Germany.

Mehmood, et al., "Bit Loading Profiles for High-Speed Data in DOCSIS 3.1", "IEEE Communications Magazine", Mar. 1, 2015, pp. 114-120, Publisher: IEEE, Published in: US.

Chapman, et al., "Mission Is Possible: An Evolutionary Approach to Gigabit-Class DOCSIS", "Proceedings of the SCTE/NCTA", May 21, 2012, p. 182, Publisher: US.

Cloonan, et al., "Examining the Future Evolution of the Access Network", Sep. 16, 2013, p. 37, Publisher: ARRIS Enterprises, Published in: US.

Cablelabs, "New Generation of DOCSIS Technology", Oct. 30, 2013, Publisher: http://www.cablelabs.com/news/new-generation-of-docsis-technology/, Published in: US.

Hamzeh, et al., "DOCSIS 3.1: Scaling Broadband Cable to Gigabit Speeds", "IEEE Communications Magazine", Mar. 1, 2015, p. 6, Publisher: IEEE, Published in: US.

Al-Banna, et al., "The Spectral Efficiency of DOCSIS 3.1 Systems", Jan. 1, 2014, p. 33, Publisher: Arris Enterprises, Inc., Published in: US.

* cited by examiner

BROADBAND PROFILE MANAGEMENT

CLAIM OF PRIORITY UNDER 35 U.S.C. § 119

The present Application for Patent claims priority to Provisional Application No. 62/420,420 entitled "BROADBAND PROFILE MANAGEMENT" filed Nov. 10, 2016, and assigned to the assignee hereof and hereby expressly incorporated by reference herein.

BACKGROUND

Field

The present disclosure relates generally to the field of communications and, more particularly, to management of broadband communication networks.

Background

Cable television systems have been around for many years, but the operators of cable television systems continuously make attempts to offer more services and faster service to meet customer demand and competition. Data Over Cable Service Interface Specification (DOCSIS) is a cable communication standard that was developed to enable the addition of high-bandwidth data transfers to an existing cable television (CATV) system. It is employed internationally by many cable television operators to provide internet access over existing infrastructure.

To accommodate higher peak rates, the DOCSIS 3.1 specifications were developed. The DOCSIS 3.1 broadband protocol was designed to dramatically increase data rates of the HFC (Hybrid Fiber-Coaxial) infrastructure through the introduction of Downstream Orthogonal Frequency Division Multiplexing (OFDM) and Upstream Orthogonal Frequency Division Multiple Access (OFDMA).

In conventional broadband communications, modulation parameters in the DOCSIS physical layer were statically configured in the Cable Modem Termination System (CMTS) and rarely, if ever, modified. It was left entirely to the CMTS to maintain and manage these static configurations using internally embedded capabilities.

These conventional broadband communication management approaches result in operational inefficiencies, and in view of the many options available within the DOCSIS 3.1 standard, underutilize network resources and fail to realize the optimization opportunities available in DOCSIS 3.1

SUMMARY

An aspect may be characterized as a method for performing broadband profile management in a cable network. The method includes establishing a network connection with a cable modem termination System (CMTS) and discovering OFDM channels utilized by the cable network where each of the OFDM channels includes a plurality of OFDM subcarriers. In addition, a current set of profiles for the cable network is discovered and each of the profiles defines a modulation order for each of the plurality of OFDM subcarriers in each OFDM channel. Obtaining signal quality values for each to the plurality of OFDM subcarriers to generate a mapping between the signal quality values and the OFDM subcarriers, and a plurality of profiles are generated based upon the mapping between the signal quality values and the OFDM subcarriers. Then each of the cable modems is assigned to one of the plurality of profiles.

Another aspect may be characterized as a system for performing broadband profile management in a cable network. The system includes a network data collector configured to establish a network connection with a CMTS and a network discovery analyzer that is configured to discover OFDM channels utilized by the CMTS and discover a current set of profiles for the cable network where each of the profiles defines a modulation order for each of the plurality of OFDM subcarriers in each OFDM channel. The system also includes a network performance analyzer configured to discover signal quality values for the cable network and a network profile designer configured to obtain signal quality values to the plurality of OFDM subcarriers to generate a mapping between the signal quality values and the OFDM subcarriers. A profile controller assigns each of the cable modems to one of the plurality of profiles.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
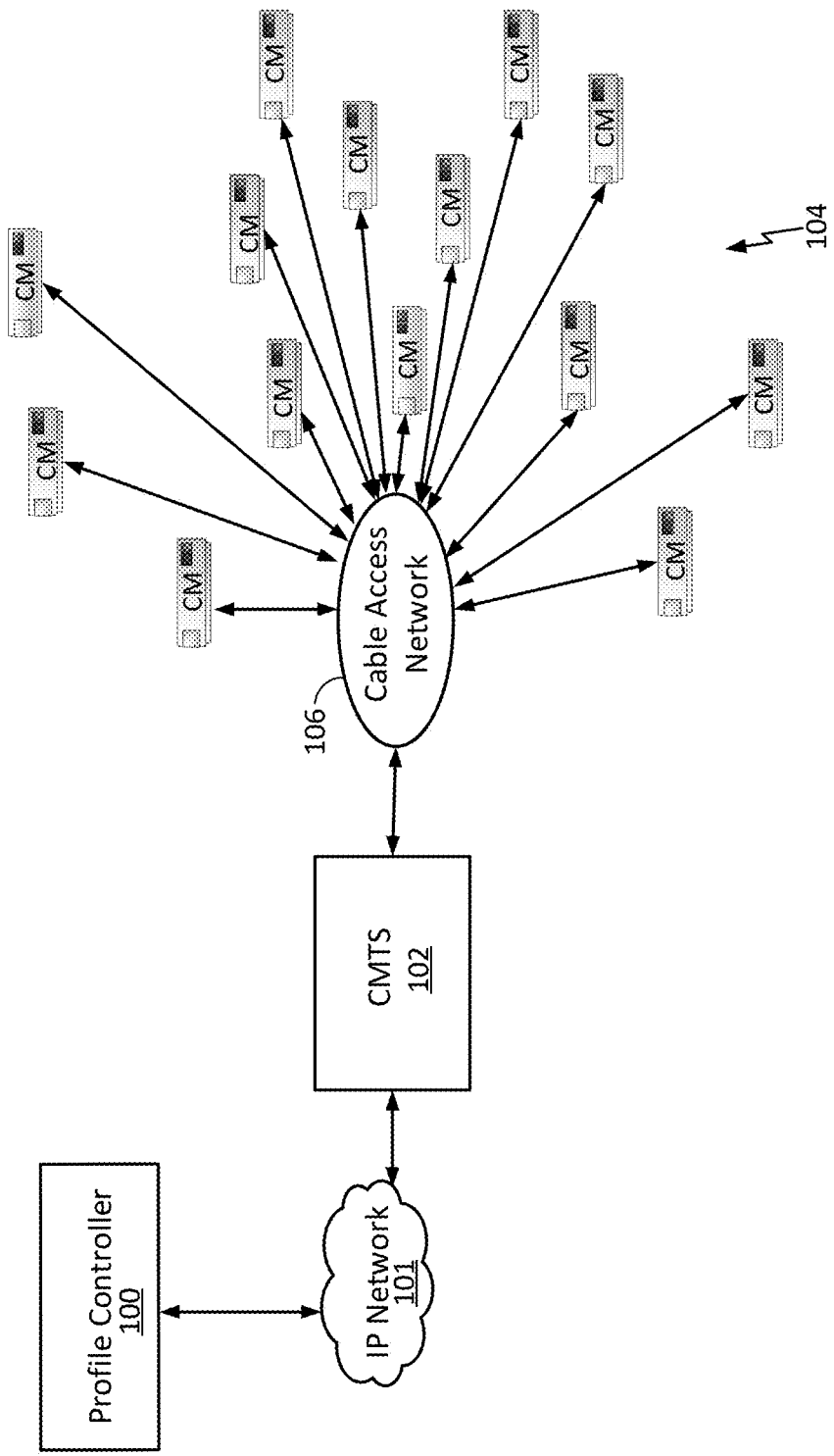
FIG. 1 is a drawing depicting an environment in which embodiments may be implemented.

Referring to FIG. 1, shown is an environment in which embodiments disclosed herein may be implemented. As shown, a profile controller 100 is coupled to a Cable Modem Termination System (CMTS) 102 via an internet protocol (IP) network 101, and the CMTS 102 is coupled to a plurality of cable modems 104 via a cable access network 106. The IP network generally represents what may be a collection of networks operating over wireless and/or wireline connections such as local area, wide area networks and the Internet. One of ordinary skill in the art in view of his disclosure will appreciate that the type of networks and constituent hardware, software, and firmware of the networks that may make up the IP network are well known.

The Cable Modem Termination System (CMTS) 102 generally operates to provide high-speed data services to potentially several thousand end users via the cable access network 106 and cable modems 104. Those of ordinary skill in the art will appreciate that the CMTS 102 may reside within a headend facility operated by a cable operator that may provide data services and television services. Although not depicted in FIG. 1 for clarity purposes, the CMTS 102 may be connected to a variety of content providers via the IP network 101 and/or other types of networks (not shown) including satellite networks and the Internet.

The cable access network 106 generally couples the cable modems 104 to the CMTS 102, and the cable access network 106 may include a combination of optical fiber and/or coaxial cables, amplifiers, and electrical/optical converters. As those of ordinary skill in the art readily appreciate, the combination of optical fiber and coaxial cables is referred to as a hybrid fiber coax (HFC) network. The cable access network 106 may include a plurality of nodes, or to a plurality of hubs that extend to respective nodes, and each of the nodes may have one or more corresponding access points, but for clarity purposes these well-known aspects of cable access networks are not shown in FIG. 1.

The cable modems 104 generally operate to receive modulated data on a downstream link from the CMTS 102 via the cable access network 106 and demodulate the modulated data for consumption by an end user. In addition, the cable modems 104 function to modulate unmodulated data for transmission upstream to the CMTS 102. The cable modems 104 may include a combination of modern DOCSIS 3.1 compliant devices and legacy modems that operate according to legacy specifications (e.g., DOCSIS 2.0) compliant modems. Although older, legacy modems, such as DOCSIS 2.0 modems, do not benefit from all the improvements in DOCSIS 3.1, but DOCSIS 3.1 is backwards compatible with older DOCSIS specifications, and the older, legacy modems may affect configuration aspects of the DOCSIS 3.1 network. The depicted cable modems 104 generally depict cable modems 104 that may be implemented as set top boxes, televisions, or unitary modems.

The profile controller 100 in many implementations can perform active and dynamic profile management within broadband communications devices across the network from the CMTS 102 to the cable modems 104. For example, many implementations of the profile controller 100 can automatically perform network analytics, customize profile design, and customize assignment of devices to profiles. In several variations, the profile controller 100 may implement the systems and methods described herein to enable automatic customization of configurable attributes for broadband communications in response to network analytics.

Although the profile controller 100 is depicted as a separate device from the CMTS 102, it should be recognized that the profile controller 100 may be implemented and co-located along with infrastructure associated with the CMTS 102. For convenience, the examples of the systems and methods are described herein in the context of managing broadband communication devices operating according to the DOCSIS (Data Over Cable Service Interface Specification) 3.1 (also referred to herein as "D3.1") broadband protocol, which is incorporated by reference. For example, the D3.1 specifications are incorporated herein for a readily available disclosure of layers of the DOCSIS 3.1 protocol stack and interaction between the CMTS 102 and the CMs 104. The DOCSIS 3.1 specifications may be found at https://www.cablelabs.com/specs/. But it is contemplated that many aspects disclosed herein may be applicable to yet-to-be-developed specifications such as future DOCSIS specifications.

The DOCSIS 3.1 specification was developed anticipating that varying the modulation order (bit-loading) across the spectrum would provide significant value in customizing the capacity and customer Quality of Experience (QoE). For example, similar to Claude Shannon's so-called "water filling" concept, in the roll-off region of the cable access network 106 (e.g., an HFC network) at higher frequencies, additional spectrum may be leveraged to expand capacity using lower density modulation in the roll-off region. In many embodiments, the profile controller 100 includes a profile management application running on a Software-Defined Networking (SDN) platform that performs network analytics, customizes profile design (e.g., customizes for optimal profile design or other customized profile design), and/or customizes CM-to-profile assignments (e.g., customizes for optimal CM-to-profile assignments or other customized CM-to-profile assignments). In SDN platforms, the system that makes decisions about where traffic is sent (i.e., the "control plane"), is abstracted and decoupled from the underlying systems that forward traffic to the destinations (i.e., the "data plane"). In a number of embodiments, the systems and methods described herein, which may be implemented in the profile controller 100, can perform network analytics, customize profile design, and/or customize CM-to-profile assignments in the control plane.

In DOCSIS 3.1 specifications, a profile is a set of attributes for an OFDM channel that can be configured to vary across the full spectrum of an OFDM or OFDMA channel. As an example, the modulation or bit-loading (from BPSK (Binary Phase-Shift Keying) to 16384 QAM (Quadrature Amplitude Modulation)) per OFDM sub-carrier can be set differently depending on the channel noise and attenuation characteristics that may vary. An OFDM channel can have different configurable attributes that influence the efficiency of the system including the size of the cyclic prefix and roll-off windowing, the number of continuous pilot signals, and the presence of exclusion bands or inactive sub-carriers to avoid significant interference sources or enable other signals that are located within the spectrum of the OFDM channel. An OFDM or OFDMA channel can operate using several different profiles simultaneously. In addition, sets of CMs 104 also can be assigned to specific profiles and the CMTS 102 may forward or schedule traffic on one of the profiles assigned to the CM 104. There are typically more modems 104 than the number of profiles available, and as a result different modems 104 can be grouped together to use different profiles based on their perspective on the channel conditions. In many embodiments, profiles can be updated dynamically to adapt to changing channel conditions, and individual cable modems (CMs) 104 can be assigned to different profiles to customize (e.g., to optimize or otherwise customize) their capacity and/or customer experience.

Performing profile management automatically within the CMTS 102 using the D3.1 CM status messaging without the profile controller 100 would involve many challenges which can be overcome by the systems and methods described herein. For example, computational resource intensity can be addressed by the systems and methods described herein. Specifically, for example, high-level analytics can be used to design customized algorithms (e.g., optimal algorithms or other customized algorithms) using techniques such as machine learning (ML) for clustering and grouping modems against a smaller number of profiles than the number of CMs 104. These types of analytical functions can be more scalable when executed by leveraging external control plane computer platforms instead of executed on infrastructure such as the CMTS 102 with the first priority of efficient packet forwarding.

As another example, historical data management can be addressed by the systems and methods described herein. In many embodiments, one or more of the analytics used to design customized (e.g., optimal or otherwise customized) DOCSIS 3.1 profiles and assign CMs 104 to profiles can be done using historical data spanning days and weeks of time in the control plane. The data plane (of which the CMTS 102 and CM 104 are a part) is generally not scalable or cost effective for storing and reporting on the length of history and volume of data sufficient to make profile customization decisions that facilitate system stability.

As a further example, system stability and durability can be addressed by the systems and methods described herein. Analysis of historical data to avoid CM profile instability can advantageously provide consistency to customize (e.g., optimize or otherwise customize) the efficiency and capacity and/or can enable customer QoE. The time frames of seconds that are available in the communication between CMs 104 and the CMTS 102, while effective at immediately resolving a network issue in real time, can be insufficient to avoid rapid oscillations between modulation profiles for a modem's channel perspective that lies in-between the available profiles. This behavior can be referred to as profile "flapping." The flapping can become problematic because it creates negative system efficiencies through a higher incidence of less-efficient shortened FEC (Forward Error Correction) codewords at each profile change and more variable capacity availability for traffic scheduling. An independent profile management application on an external network controller can be used to readily track historical behaviors, which can facilitate managing this type of "flapping" using techniques like machine learning and time-based statistical analytics.

As another example, historical analytics can be addressed by the systems and methods described herein. Control systems generally involve metrics that are customized, such as to optimize the metrics. The success of a control system can be measured by tracking these metrics over time. These metrics may include measures of network capacity, packet loss, OFDM profile stability, and customer experience. Additional metrics that quantify the effectiveness of grouping algorithms, the total network capacity performance of the system, and the efficiency of the profile design for individual cable modems 104 over time can be used to quantify the improvements attained and potentially attainable with investment in network maintenance. Network management systems and data storage can track and manage these metrics over time. These components can be better implemented on external computer platforms than on systems internal to the data forwarding plane infrastructure.

As a further example, system vendor interoperability can be addressed by the systems and methods described herein. For DOCSIS 3.1 equipment, a variety of CMTS 102 and CM 104 vendors are available in the market. Most service providers choose to deploy multi-vendor environments to ensure a healthy supplier eco-system. Managing the profile design and assignment in a vendor agnostic network controller can allow the service provider to configure and manage all or many of their vendor solutions to ensure a consistent user experience for all or many customers on their network. An alternative can be for different vendors' CMTS 102 equipment to provide different experiences for different populations of customers attached to the specific CMTS 102.

As another example, modern network architecture can be addressed by the systems and methods described herein. Modern network architecture generally separates the control plane from the data plane using SDN architectures and techniques. This allows reduced investment in specialized hardware platforms in exchange for investment in software that enables the service provider to have more control over the features, functions and delivery schedule. These functions are often referred to as virtual network functions (VNF) within this trend referred to as SDN and Network Function Virtualization (NFV). These programmable network techniques can enable service providers to update and develop new algorithms for profile optimization at a rate more typically associated with software development. The software development rate is much faster than performing hardware-based upgrades and associated lifetimes of upgrades to specialized infrastructure. This approach to network operations is sometimes referred to as Development and Operations (DevOps). These programmable network platforms also provide the benefit of open source communities and modular design enabling new features to adapt to different network specialized infrastructure having a low impact on the base network controller platform. Examples of network controller platform open source projects include OpenDaylight, among others.

As a further example, network abstraction and platform re-use can be addressed by the systems and methods described herein. The modular design enables a transition to access agnostic network and service management. Consumer and enterprise broadband service can be provided agnostic to the underlying network architecture. For example, if the network is based on a mix of fiber optic PON (Passive Optical Network), HFC-based DOCSIS, Wi-Fi, or 4G/5G mobile wireless, the special network nuances can be abstracted from the services. Not only can a D3.1 network be optimized in an SDN architecture, but a Radio Resource Management (RRM) VNF can be deployed for Wi-Fi and a Radio Network Controller Self-Organizing Network (SON) function can manage the mobile wireless network. The SDN Controller abstracts the modular software that communicates with the access network and enables different VNFs to optimize these systems as required to deliver consistent and seamless service independent of the underlying network technology.

Figure 2:
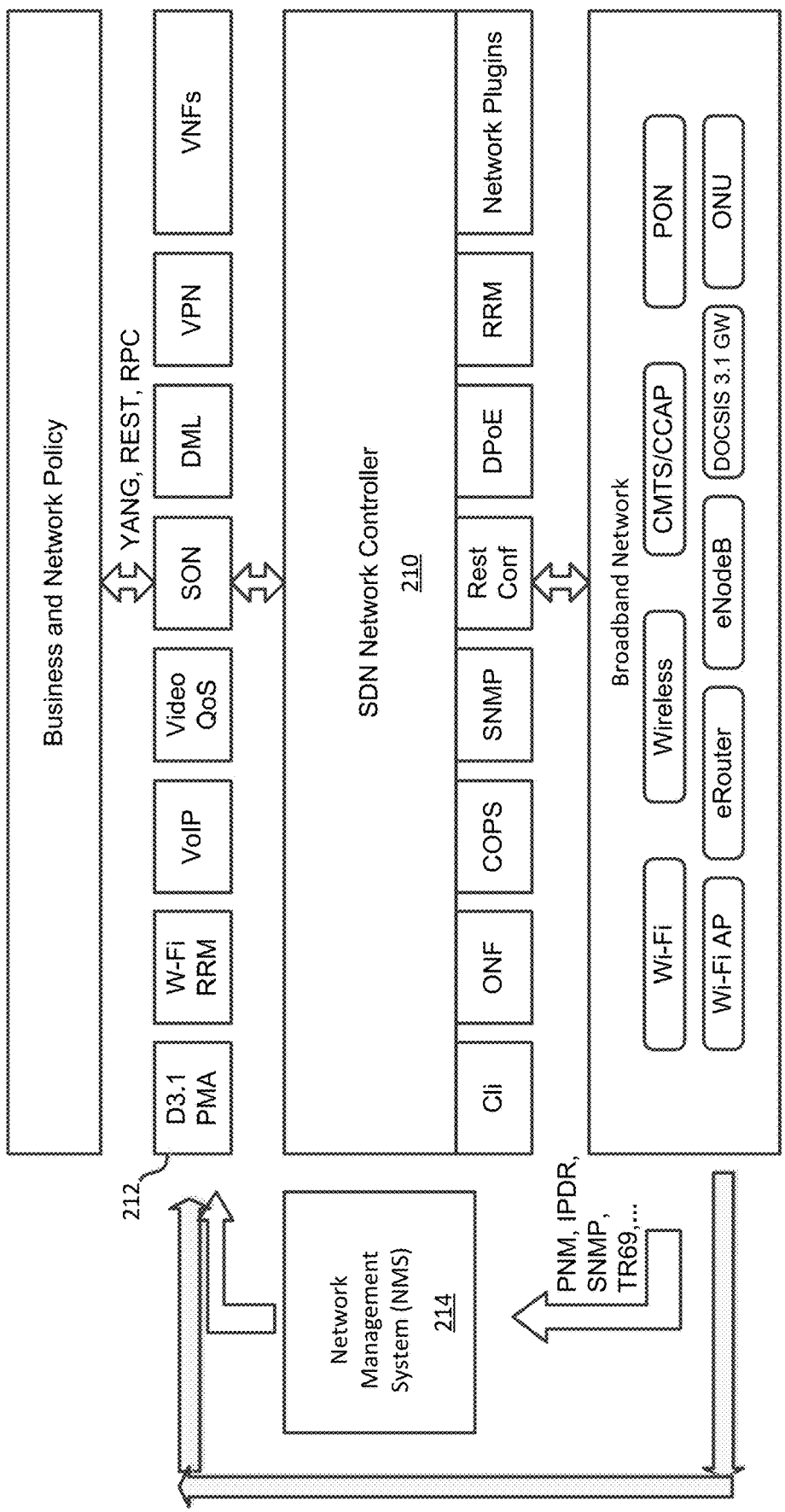
FIG. 2 is a block diagram of a system employing a programmable profile optimization network architecture.

Referring to FIG. 2, shown a block diagram of a system employing a D3.1 profile optimization programmable network architecture. The system of FIG. 2 is merely exemplary and is not limited to the embodiments presented herein. The system can be employed in many different embodiments or examples not specifically depicted or described herein. In many embodiments, the system can include an SDN Network Controller 210 in communication with one or more broadband network components, such as the CMTS 102. In several embodiments, the system can include one or more network plug-ins, which can be used to obtain data from and/or communicate configuration and policy to the broadband network components, such as access network components.

In various embodiments, the system can include one or more VNFs, which can communicate with the SDN Network Controller. For example, a D3.1 PMA (Profile Management Application) VNF 212 can be used to perform network analytics, customize profile design, and/or customize CM-to-profile assignments. In several embodiments, the system can include a Network Management System (NMS) 214, which can be used to collect and aggregate data from the broadband network devices to facilitate providing metrics supporting the analytics for profile optimization. Other VNFs and other access network types and protocols are possible and can be modularly added to the system. In many embodiments, the VNFs can be a virtual machine running on the SDN Network Controller 210 and/or the NMS 214. Moreover, some of the VNFs, such as the PMA VNF 212 may be remotely located from the SDN network controller 210, the NMS 214, and other components of a broadband network such as the CMTS 102. For example, the PMA VNF 212 may be implemented within the profile controller 100, which may be physically separated from the CMTS 102.

In many embodiments, a method for profile management can be used, which can involve: (a) obtaining configuration and profile current state (also referred to herein as "network discovery"), (b) data analysis, (c) profile design, (d) configuration (also referred to herein as "profile control"), and/or (e) profile assignment. As used herein, the term CMTS and CCAP (Converged Cable Access Platform) are synonymous and replaceable, except as part of a specific MIB (Management Information Base) name. The details described below apply to an OFDM downstream as an example. Analogous operations also exist and are contemplated by this disclosure for an OFDMA upstream based on profile, so that Data IUCs (Interval Usage Codes) are contemplated by this disclosure. In some implementations the method for profile management may be carried out by the PMA VNF 212.

Figure 3:
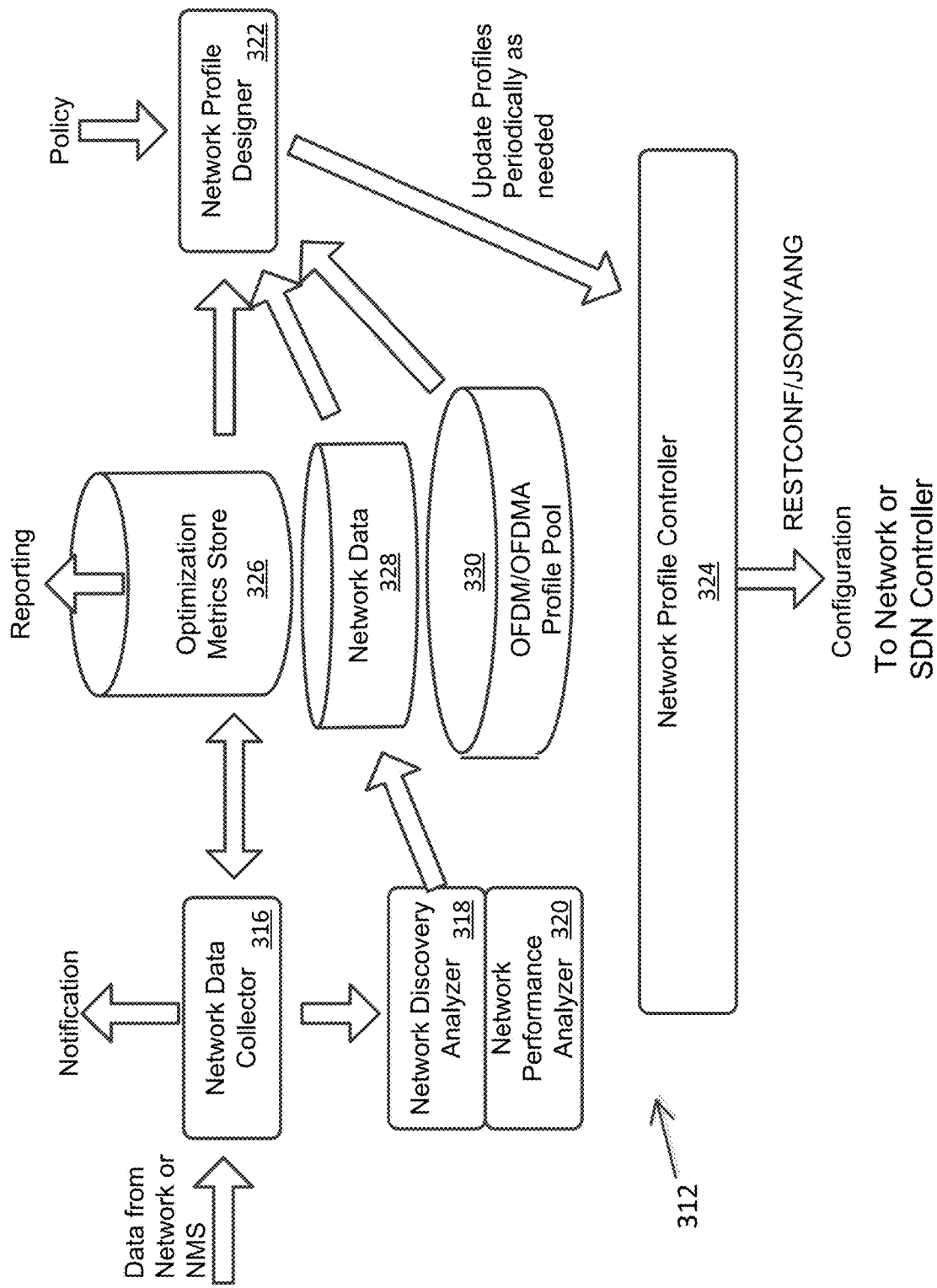
FIG. 3 is a block diagram depicting aspects of an exemplary profile management application.

Turning to FIG. 3, shown is a block diagram of functional elements of a PMA, such as the D3.1 PMA VNF 212 shown in FIG. 2. The PMA 312 of FIG. 3 is merely exemplary and is not limited to the embodiments presented herein. The PMA 312 can be employed in many different embodiments or examples not specifically depicted or described herein. In many embodiments, the PMA 312 can include a number of functional components, such as a network data collector 316, network discovery analyzer 318, network performance analyzer 320, a network profile designer 322, and a network profile controller 324. In several embodiments, these components can perform functions as described below in further detail. In various embodiments, the PMA 312 can include one or more datastores, such as an Optimization Metrics Store 326, a network data datastore 328, and an OFDM/OFDMA Profile Pool 330.

Figure 4:
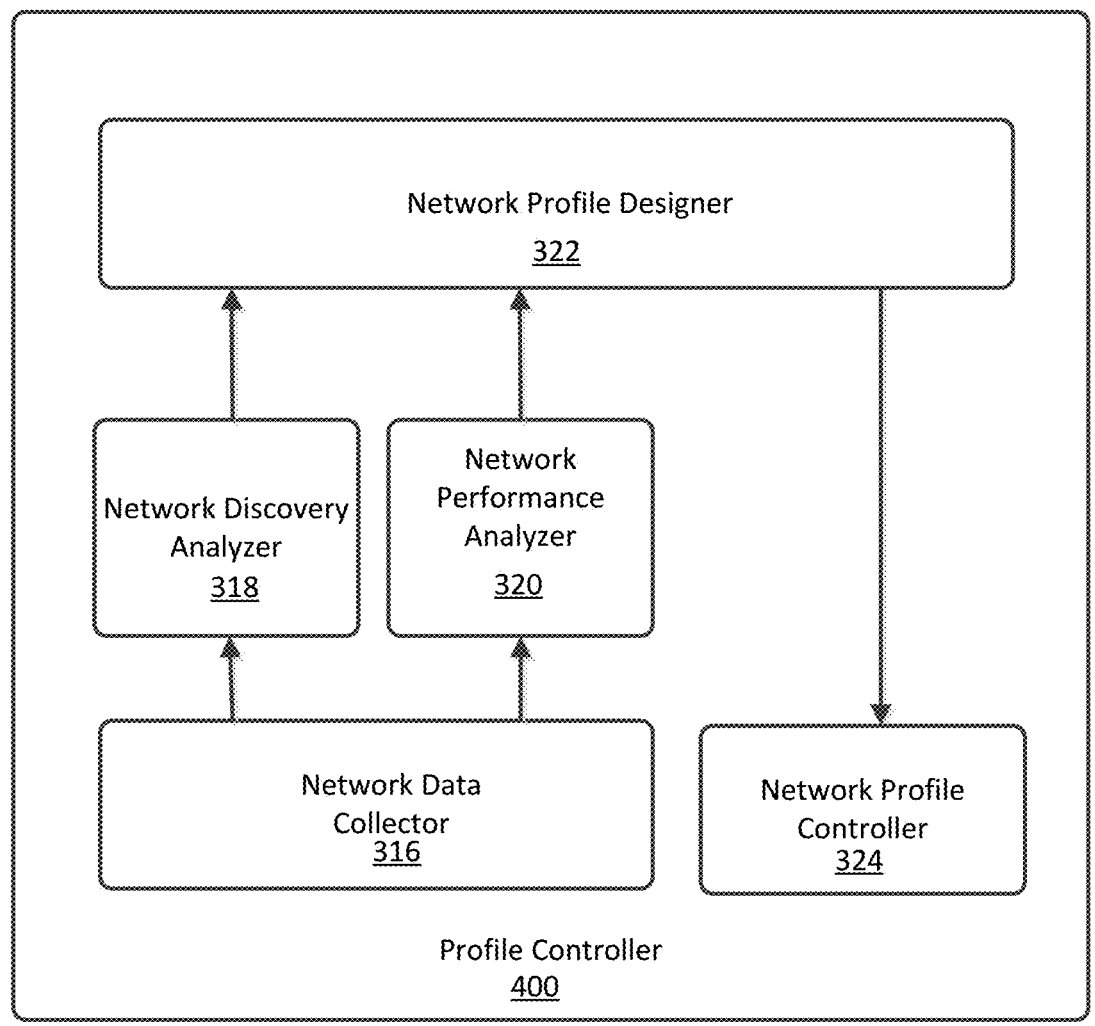
FIG. 4 is a block diagram depicting an exemplary profile controller.

Referring to FIG. 4, shown is a block diagram depicting aspects of the PMA 312 implemented in a profile controller 400, which may be used to realize the profile controller 100 depicted in FIG. 1. As shown, the network data collector 316 is coupled to both the network discovery analyzer 318 and the network performance analyzer 320, which are both coupled to the network profile designer 322, which is coupled to the network profile controller 324. The profile controller 400 may include the datastores depicted in FIG. 3, but for clarity the datastores are omitted from FIG. 4.

The depiction of the components in FIGS. 3 and 4 is a logical depiction of functional components described further herein, which may be implemented by hardware in connection with software and/or firmware. It should be recognized that when implemented, some of these components may be combined in an integrated construct that performs multiple functions. In addition, the depicted components may be realized by a collection of distributed components (e.g., distributed hardware or hardware with distributed software and firmware components), and some of the underlying components may be reused to realize the components in FIGS. 3 and 4. For example, it is contemplated that the network discovery analyzer 318 and the network performance analyzer 320 may share common software modules.

It is also contemplated that the network discovery analyzer 318 and network performance analyzer 320 may be implemented as an integrated component that performs the functions of both components.

In general, the PMA 312 and profile controller 400 enable broadband profile management in a cable network that provides data services to the plurality of cable modems 104 with the cable modem termination System (CMTS) 102. The network data collector 316 generally functions to establish a network connection with the CMTS (e.g., directly or through a network management system (NMS)(e.g., the NMS 214) that is coupled to the CMTS 102). The network discovery analyzer 318 is configured to discover OFDM channels utilized by the cable network where each of the channels includes a plurality of OFDM subcarriers. In addition, the network discovery analyzer 318 may discover a current set of profiles for the cable network where each of the profiles defines a modulation order for each of the plurality of OFDM subcarriers in each OFDM channel. The network performance analyzer 320 generally operates to discover performance attributes (e.g., signal quality values) of the cable network. The network profile designer 322 is configured to obtain signal quality values for the plurality of OFDM subcarriers to generate a mapping between the signal quality values and the modulation configuration of the OFDM subcarriers. The profile controller 324 is configured to assign each of the cable modems 104 to one of the plurality of profiles. The assignment may include an assignment of profiles that are improved over existing profiles based upon the channel conditions (e.g., noise conditions), which the signal quality values provide a measure of.

For purposes of explaining the various aspects of the profile management systems and methods disclosed herein, "OFDM channels" generally refers to downstream OFDM channels and upstream OFDMA channels unless the context of the description is detailing features of OFDMA that are different than OFDM.

Figure 5:
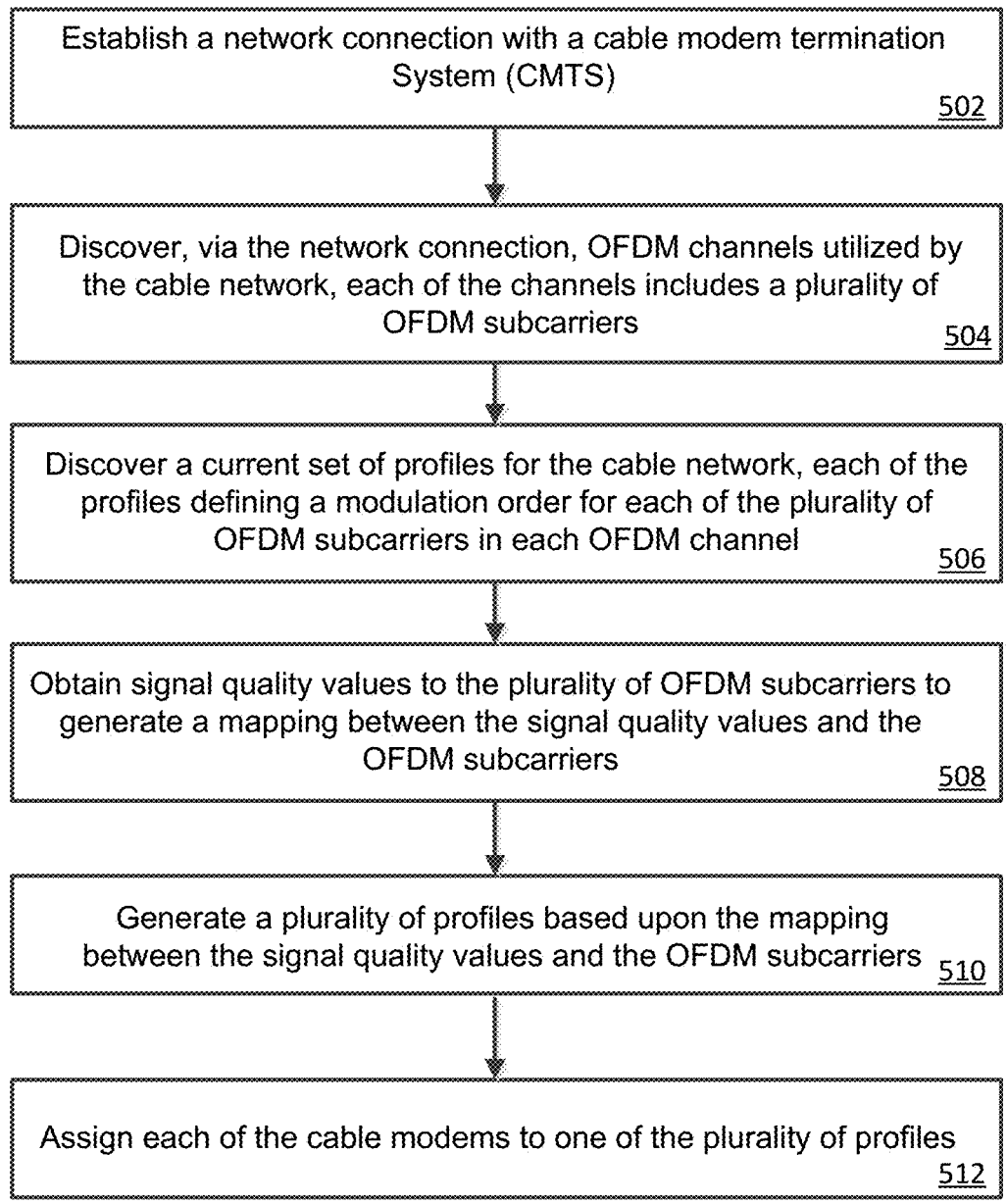
FIG. 5 is a flowchart depicting a method for managing aspects of the environment depicted in FIG. 1.

While referring to FIGS. 3 and 4 simultaneous reference is made to FIG. 5 which is a flow chart depicting a method for performing broadband profile management. As shown in FIG. 5, the profile controller 400 may establish a network connection (e.g., IP network connection) with the CMTS 102 (Block 502). For example, the profile controller 400 may connect directly to the CMTS 102 (without using the NMS 214) or may connect indirectly to the CMTS 102 by communicating with the NMS 214. Once the network connection is made, OFDM channels utilized by the cable network may be discovered (Block 504).

1. Network Discovery

The network discovery analyzer 318, can discover the current set of profiles associated with each channel, which can be changing dynamically (Block 506). The current profile information that changes for a specific profile or for a specific spectrum band cannot be obtained from the CM 104 although that is where the current RF performance information can be obtained for downstream customization (e.g., optimization or other customization). In many embodiments, this information can be obtained from the CMTS 102 using network management instrumentation defined in the DOCSIS 3.1 Specifications through the NMS 214 of FIG. 2 and the network discovery analyzer 318 of FIG. 3. For example, different forms of network discovery may be obtained and/or performed through the NMS 214 or directly with the CMTS 102 to perform channel discovery, CM profile discovery, exclusion band and non-data subcarrier discovery, and/or other suitable forms of network discovery.

1.1 Channel Discovery

Under the DOCSIS 3.1 specification, basic core channel information can be found from the docsIf31CmtsDsOfdmChanTable with the network discovery analyzer 318. This disclosure describes customization (e.g., optimization or other customization) of profile information that may change over spectrum, but significant gains in capacity may be obtained by customizing (e.g., optimizing or other customizing) the channel attributes, such as the cyclic prefix, which is contemplated by the disclosure. For example, a cyclic prefix of 5 usec (microseconds) for a 20 usec OFDM symbol is a significant overhead of approximately 25%. If the delay and delay variability of the channel is measured to be small by the NMS 214 of FIG. 2 and network performance analyzer 320 of FIG. 3, then the inefficiency of the cyclic prefix and associated window roll-off function can be substantially reduced. Specifically, in a number of embodiments, the following data elements, as described in the DOCSIS 3.1 information model, can be used in the profile management:

docsIf31CmtsDsOfdmChanChannelId
docsIf31CmtsDsOfdmChanPlcFreq
docsIf31CmtsDsOfdmChanSubcarrierZeroFreq
docsIf31CmtsDsOfdmChanFirstActiveSubcarrierNum
docsIf31CmtsDsOfdmChanLastActiveSubcarrierNum
docsIf31CmtsDsOfdmChanSubcarrierSpacing
docsIf31CmtsDsOfdmChanCyclicPrefix
docsIf31CmtsDsOfdmChanRollOffPeriod Although these examples describe the use of SNMP (Simple Network Management Protocol), other suitable forms of management instrumentation can be used, including but not limited to: IPDR (IP Detail Record) Service Definitions, CMTS Command Line Interface (CLI) or a REST (Representational State Transfer)-based interface, such as being developed by CableLabs in further specifications. From these data elements, the following derived metrics can be calculated, and can be added as attributes of an OFDM channel in the information model. The frequencies calculated below describing the OFDM channel are in units of MHz (megahertz).

LowOfdmChanFreq=
(docsIf31CmDsOfdmChanSubcarrierZeroFreq+
docsIf31CmDsOfdmChanSubcarrierSpacing*1000*
docsIf31CmDsOfdmChanFirstActiveSubcarrierNum−
docsIf31CmDsOfdmChanSubcarrierSpacing*500)/1e6

HiOfdmChanFreq=
(docsIf31CmDsOfdmChanSubcarrierZeroFreq+
docsIf31CmDsOfdmChanSubcarrierSpacing*1000*
docsIf31CmDsOfdmChanLastActiveSubcarrierNum+
docsIf31CmDsOfdmChanSubcarrierSpacing*500)/1e6

Note SubcarrierZeroFreq MIB is in units of Hz, and SubcarrierSpacing is in units of kHz, PlcFreq is in units of Hz, cyclic prefix and roll-off period are in number of samples. To turn Cyclic prefix into units of micro-seconds, the number of samples can be divided by 204.8.

In some embodiments, after establishing the core configuration for the OFDM channel, the elements of the channel that can change across frequency spectrum, such as variable bit loading or exclusion bands, can be obtained. This information is what is commonly referred to as the profile. The network discovery analyzer 320 may also obtain this information from the CMTS 102 through the docsIf31CmtsDsOfdmSubcarrierStatusTable and the docsIf31CmtsDsOfdmSubcarrierTypeTable. In the upstream the sample rate may be 102.4 Msamples (million samples)/sec.

From these tables, the modulation and exclusion bands can be identified by the network discovery analyzer 318, in many embodiments, such as by using the following approach. Because these MIB tables described above and below are associated with a specific OFDM channel ifIndex, or ifIndex, ProfileID, they can be identified with a specific downstream channel. The downstream channel can be tracked by its downstream channel Id (DCID) or ifIndex. Mapping the ifIndex to a name and type is described below. Mapping the DCID to an ifIndex can also be done, as some of the data from the network can be tracked by DCID (or in the upstream, UCID), some by ifIndex, and some by a combination of ifIndex and Profile ID (or DataIuc in the upstream). In some embodiments, the automatically building these topology relationships and maintaining a topology mapping can be performed before identifying the associated profile data.

In several embodiments, discovering which OFDM downstream channel ifIndex on the CMTS 102 a particular one of the cable modems 104 is attached to could be performed in various ways. For example, the network data collector 316 may connect with the NMS 214, and the NMS 214 can provide real time information in a targeted way by collecting data from the docsIfCmtsMacToCmTable. This table can return an index to the specific row associated with the particular modem in the docsIf3CmtsCmRegStatusTable and the docsIf31CmtsCmRegStatusTable. Alternatively, as another example, the NMS 214 could just walk these complete tables, which can be much less efficient, but can be done as part of the NMS 214 and PMA 312 initialization process to discover all D3.1 modems. This table can have the docsIf3CmtsCmRegStatusMdIfIndex (the ifIndex of the MAC domain containing the CM) on the same row as the CM's MAC address and the same row as the profiles of the CMs 104 and OFDM channel ifIndex from the docsIf31CmtsCmRegStatusDsProfileIdList if it's a DOCSIS 3.1 modem. Additionally, the ProfileIucList obtained from the same row can have the analogous upstream topology and profile information. Note that the initial MIB for the ProfileIdList used the Downstream Channel ID (DCID) to identify the downstream. The was modified by ECN (Engineering Change Notice) to be ifIndex.

In a number of embodiments, once the NMS 214 gets (or the network data collector 316 directly gets) the docsIf3CmtsCmRegStatusMdIfIndex associated with the CMs MAC address, then it can find the OFDM channels associated with the MAC domain from a table called the ifStackTable. If the NMS 214 collects the ifStackStatus which is 0.1.3.6.1.2.1.31.1.2.1.3, it can return the MD ifIndex and a set of interface ifIndex including the OFDM channel. Alternatively, it can collect the OFDM channel ifIndex from the ProfileIDList, assuming the CMTS 102 is updated with the Spring 2016 ECN. Next, the NMS 214 can verify it is an OFDM channel by ifType 277, and get its name from ifDescr. An upstream channel in the MAC domain can be identified by ifType 278.

There can be multiple OFDM or OFDMA channels in a MAC domain. The MDifIndex can be an upper layer to multiple OFDM channels of ifType 277 and 278. They can have different names in ifDescr, and they can have different DCIDs or UCIDs. OFDM attributes that can be used to readily differentiate them are the docsIf31CmDsOfdmChanChannelId and docsIf31CmtsDsOfdmChanChannelId. Both of these tables are indexed by ifIndex, so the DCID can be mapped to the ifIndex. The other attribute is docsIf31CmtsDsOfdmChanPlcFreq and docsIf31CmDsOfdmChanPlcFreq. The NMS 214 and D3.1 PMA network discovery analyzer 318 and Optimization Metrics Store 326 can track this information as unique topology elements. These topology elements can be identified by concatenating the name or ifindex with the DCID or the PlcFreq to uniquely differentiate the OFDM downstream channels on the same MAC interface.

1.2 CM Profile Discovery

As discussed above, the network discovery analyzer 318 may identify the profiles the modems are using (Block 506). For example, the network discovery analyzer 318 may obtain this information from the CCAP of the CMTS 102 or CMs 104. Because the Rx Power data comes from the CMs 104, the profiles can be obtained by collecting from the docsIf31CmDsOfdmProfileStatsTable, which includes an index that identifies both the CM ifIndex of the OFDM channel, and the ProfileId {ifIndex, docsIf31CmDsOfdmProfileStatsProfileId}. Because docsIf31CmDsOfdmProfileStatsProfileId is part of the index, getting one of the other objects from the table (such as docsIf31CmDsOfdmProfileStatsInOctets) can identify all of the ProfileIds assigned to that CM associated with the ifIndex. There can be more than 1 ProfileId in many cases. Since there can be multiple OFDM channels, this process can be done for each channel, which will have a unique ifIndex of ifType 277 along with the RX Power values obtained for each channel. Note the ifIndex of the CM 104 will not match the ifIndex from the CMTS 102, but the ProfileId can match. The ProfileId can be unique within the ifIndex of the downstream channel. The two downstream OFDM channels can be differentiated, as explained in the topology discovery description above. DCID or PlcFrequency are examples that can be obtained from the modem and the CMTS for the same OFDM channel, and this information can match.

Alternatively, the network discovery analyzer 318 can determine profiles in use by the CMs 104 by accessing the docsIf31CmtsCmRegStatusDsProfileIdList from the CMTS 102. This source can be a good place to get the information because the profile definitions can be obtained from the CMTS 102. Analogous approaches also work for upstream channels and profiles.

In several embodiments, to obtain the modulation in the downstream, the network discovery analyzer 318 can collect the modulation per band of sub-carriers from the DocsIf31CmtsDsOfdmSubcarrierStatusTable. This table can be indexed by the ifIndex, the ProfileId, and the SubcarrierStartId that is the beginning of a spectrum range of sub-carriers that have the same modulation. The SubcarrierEndID is the ID of the last subcarrier in that range that carries the same modulation. The ProfileId can match the docsIf31CmDsOfdmProfileStatsProfileId obtained from the CMs 104 or the docsIf31CmtsCmRegStatusDsProfileIdList obtained from the CMTS 102. Note the ifIndex of a CM 104 will not match the ifIndex on the CMTS 102, but the ProfileID can be unique per CMTS downstream ifIndex. The specific MIB objects are docsIf31CmtsDsOfdmSubcarrierStatusStartId (part of index), docsIf31CmtsDsOfdmSubcarrierStatusEndId, and docsIf31CmtsDsOfdmSubcarrierStatusModulation. Table 1 below is a Modulation MIB definition, which maps the value of docsIf31CmtsDsOfdmSubcarrierStatusModulation to the modulation value listed below in Table 2 and Table 3. An analogous process can be used for the upstream channel based on the upstream object models.

TABLE 1

| docsIf31CmtsDsOfdmSubcarrierStatusModulation enumeration | Modulation Mapping | Bits/Hz |
|---|---|---|
| 1 | Other | NA |
| 2 | zero Valued | 0 |
| 3 | Qpsk | 2 |
| 4 | qam16 | 4 |
| 5 | qam64 | 6 |
| 6 | qam128 | 7 |
| 7 | qam256 | 8 |
| 8 | qam512 | 9 |
| 9 | qam1024 | 10 |
| 10 | qam2048 | 11 |
| 11 | qam4096 | 12 |
| 12 | Qam8192 | 13 |
| 13 | Qam16384 | 14 |

1.3 Exclusion Band and Non-Data Subcarrier Discovery

In many embodiments, the exclusion bands or non-data subcarriers can be identified by the network discovery analyzer 318 through a range of subcarrier indexes that are considered classified by type in the MIB. This section describes how to identify the subcarriers that are excluded, and also describes how to convert the subcarrier ID into a frequency value so that the different exclusion bands can be identified by the PMA as:

Start frequency of exclusion band
Stop frequency of exclusion band.

In several embodiments, in the downstream direction the exclusion bands can be identified from the docsIf31CmtsDsOfdmSubcarrierTypeTable. In this table, the docsIf31CmtsDsOfdmSubcarrierTypeSubcarrierType can indicate the type of subcarrier with the following bullet values. Excluded sub-carriers are identified with enumeration 4. Other non-data subcarriers can be identified per this enumeration also.

data(1)
plc(2)
continuousPilot(3)
excluded(4)

In many embodiments, to convert the excluded subcarrier ID to the actual edge frequency of the sub carrier in the exclusion band (in MHz), the network discovery analyzer 318 or NMS 214 can add the half-subcarrier to the top and bottom of the band which is the approach described below.

DsStartScFreq=docsIf31CmtsDsOfdmChanSubcarrier
  ZeroFreq/1000000+docsIf31CmtsDsOfdmSubcarrier
  TypeStartSubcarrierId*docsIf31CmtsDsOfdmChan
  SubcarrierSpacing/1000−docsIf31CmtsDsOfdm Chan-
  SubcarrierSpacing/1000/2
DsEndScFreq=docsIf31CmtsDsOfdmChanSubcarrier
  ZeroFreq/1000000+docsIf31CmtsDsOfdmSubcarrier
  TypeEndSubcarrierId*docsIf31CmtsDsOfdmChan
  SubcarrierSpacing/1000+
  docsIf31CmtsDsOfdmChanSubcarrierSpacing/1000/2

In various embodiments, in the downstream, the PLC (PHY Link Channel), which is 400 kHz wide and placed at the center of a 6 MHz equivalent channel, can be for control and initialization messages, and not for data. The center frequency of this 400 kHz band can be found by docsIf31CmtsDsOfdmChanPlcFreq from the CMTS or docsIf31CmDsOfdmChanPlcFreq from the CM, which reports in units of Hz, and can be divided by 1×10^6 to convert to Mhz. With the exception of the PLC, analogous metrics can be created for the upstream along with calculating minislot definitions, which can set the resolution of upstream profile changes.

The network performance analyzer 320 is configured to discover signal quality values for the cable network.

Examples of signal quality values include MER values, codeword errors, and power values. This signal quality values may be indicative of channel noise and/or attenuation issues. As discussed below, the signal quality values may be obtained for the OFDM subcarriers to generate a mapping between the signal quality values and the OFDM subcarriers (and the profiles defining the modulation order for each of the OFDM subcarriers) (Block 508). And as discussed below, a plurality of profiles (e.g., optimized or improved profiles) may be generated based upon the mapping between the signal quality values and the OFDM subcarriers (Block 510).

2. Data Analysis 2.1 Channelizing Subcarrier Bands

In many embodiments, several elements of data used for the analysis can be obtained with different topological resolution, such as per profile, or per OFDM channel, or per CMTS. Other elements can be obtained with different spectrum resolution, such as per sub-carrier, per band of sub-carriers, per frequency, or per 6 MHz equivalent channel. In the upstream, this may include topological resolution of minislots, which can be a band of sub-carriers 400 kHz wide in the frequency dimension and a number of OFDM symbols in the time dimension.

Figure 6:
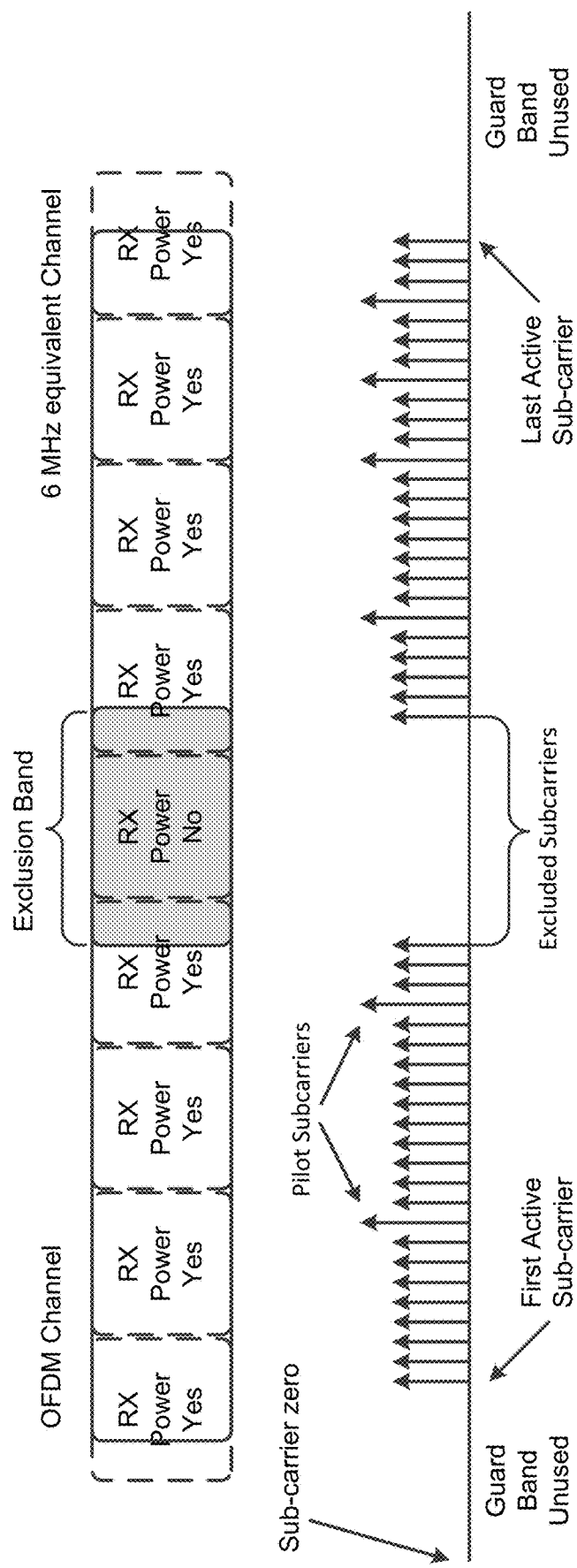
FIG. 6 illustrates an example of an OFDM spectrum with Rx Power 6 MHz equivalent channels overlaid onto the OFDM spectrum with a PHY link channel and subcarriers.

In several embodiments, to calculate the profile to use for the channel, this data can be normalized and mapped together, which can allow it to be consistently evaluated over the same spectrum. FIG. 6 illustrates an OFDM spectrum example of what the spectrum looks like with Rx Power 6 MHz equivalent channels overlaid onto the OFDM spectrum with a PLC and subcarriers. Note the RxPower measurements overlapping an exclusion zone or guard band can be lower power in general based on the number of active subcarriers in the measurement. Some embodiments can include normalizing these metrics, for example, if only 30 of 100 subcarriers are active in the 6 MHz equivalent channel, the power can be corrected by adding 10*log 10(12/30) to the RxPower value as if it was a flat PSD to enable analysis of the power levels sufficiency. The normalization can get values accurate and/or correctly aligned in time and frequency. Based on the SDN architecture described in FIG. 2, a different network plugin functionality can be used to collect the data from one CMTS 102 or CM 104 using a first method and a second method when the specifications or implementation specifics against the standard OSS (Operations Support System) interface result in different behavior of the network management agent on a different vendor or software or hardware versions of another CMTS 102 or CM 104. Alternatively, all or several metrics can be normalized on a per sub-carrier level, or to a frequency resolution in-between, such as 1 MHz bands. The number of sub-carriers can be dependent on the sub-carrier spacing or FFT (Fast Fourier Transform) size, but the number of active subcarriers can be less than the nominal number of subcarriers (e.g., 2048, 4096, or 8192 (in the downstream)) due to unused subcarriers. The modulation can be defined for each profile which is available on the OFDM channel.

In a number of embodiments, to normalize the data, a data structure can be developed along the lines of that described below in Table 2. Table 2 stores PHY Layer Metrics Data mapping with example data for each OFDM DS channel. This data can be stored much more efficiently, such as described in a spectrum band, as is done in some of the MIBs because there is a lot of redundancy. For ultimate flexibility, instead of 6 MHz equivalent channels, the columns could be sub-carrier ids for the highest resolution or sub-carrier center frequencies, or a higher resolution 1 MHz frequency band. This expansion can allow it to be normalized for analysis, and can be stored in the normalized form, or converted to it at query time to facilitate software scalability. This data is shown in this model at the resolution of 6 MHz equivalent channels, which are defined at centerfreq=111+6(n−1), where n can go from 1 to 185, so center frequencies go from 111 MHz to 1215 MHz. The columns of Table 2 can be generated and/or stored in units of frequency or sub-carrier numbers. The example shown uses frequencies structured around the RX Power 6 MHz equivalent channels and it reports out in frequency, not sub-carriers. Tables such as Table 2 can exist for each OFDM downstream channel for each CM 104 operating as a D3.1 modem, and the Rx Power level, MER (Modulation Error Ratio) per subcarrier values, and profile assignments can be unique for that CM's OFDM downstream channel.

TABLE 2

| | 6 MHz Channel Center Frequency (MHz) | | | | | | | | |
|---|---|---|---|---|---|---|---|---|---|
| Metric | 796 (PLC Freq.) | 711 | 717 | 723 | 729 | ... | 805 | 811 | 817 |
| RxPower | 0 | 1 | 0 | −1 | 1 | ... | −2 | −4 | −6 |
| MER | 38 | 39 | 40 | 0 | 38 | ... | 34 | 33 | 32 |
| P4 Current Modulation | 1024 | 1024 | 1024 | 1024 | 1024 | ... | 1024 | 1024 | 1024 |
| P2 Current Modulation | 4096 | 4096 | 4096 | 4096 | 4096 | ... | 4096 | 4096 | 4096 |
| P1 Current Modulation | 2048 | 2048 | 2048 | 2048 | 1024 | ... | 1024 | 512 | 512 |
| P0 Current Modulation | 256 | 256 | 256 | 256 | 256 | | 256 | 256 | 256 |
| SC Type | Data | Data | Data | Exclusion | Data | ... | Data | Data | Data |

In some embodiments, the MER can be mapped from sub-carrier into this coarser resolution. In other embodiments, a single modulation can be mapped from a band of sub-carriers down to the sub-carrier or frequency level, and then back up to the 6 MHz equivalent channel level as part of the Data Analysis component of the D3.1 PMA. This process can include normalization across different vendor implementations, unit adjustments, value adjustments, or alignment in frequency and time, for example. An example of the normalization process from the MIB format is described below.

Different CMTSs 102 can have different capabilities for high resolution in bit loading. For example, CMTS vendor A can support 6 MHz blocks for different modulation, while CMTS vendor B supports 1 MHz resolution. There also can be a trade-off between the very fine adaption of bit loading versus finding a reasonable number of profiles to support the number of modems on the channel. Initially, the number of D3.1 modems on the channel in any deployment can be small. An increase in the number of profiles in use on the channel also can increase latency and coding overhead creating a countering inefficiency. This specific example assumes that the minimum resolution of varying the modulation is on a 6 MHz equivalent channel basis. One skilled in the art will understand that if it can be changed to 1 MHz or per sub-carrier.

2.2 Applying Network Instrumentation to Sub-Channels
2.2.1 Measuring RX Power

Figure 7:
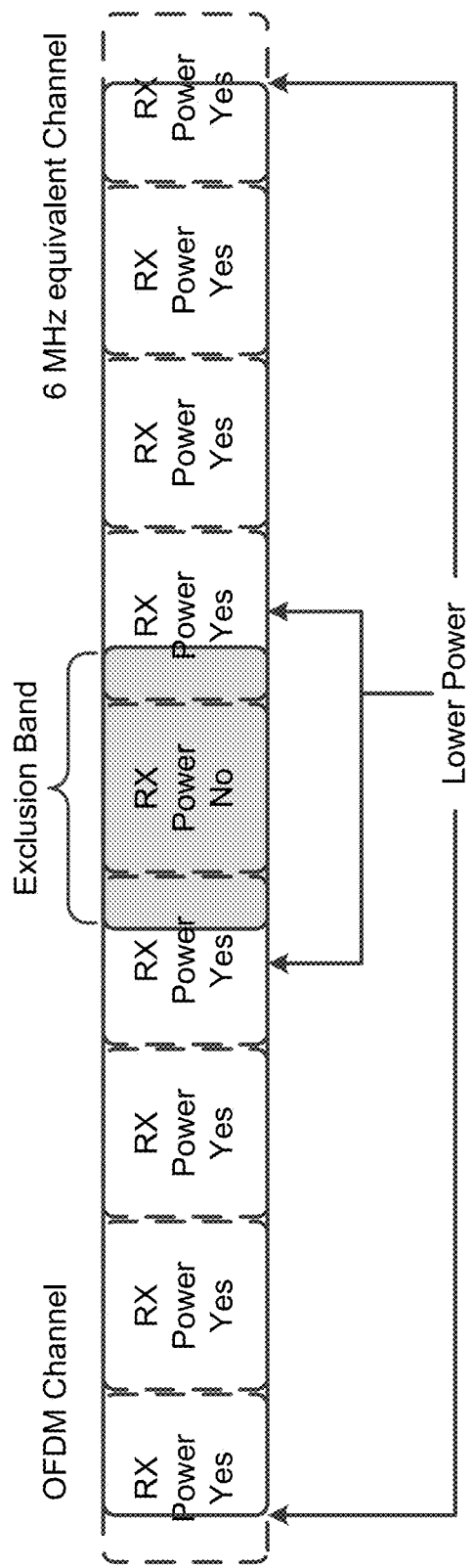
FIG. 7 shows an example of a downstream receive RX Power across an OFDM spectrum.

In a number of embodiments, to determine the downstream RX Power data, docsIf31CmDsOfdmChannelPowerTable from the CMs 104 can be accessed. This table includes 3 objects as identified in the DOCSIS 3.1 interface MIB:

docsIf31CmDsOfdmChannelBandIndex
docsIf31CmDsOfdmChannelPowerCenterFrequency
docsIf31CmDsOfdmChannelPowerRxPower CableLabs developed an ECN affecting this table that was included in the I07 release of the OSSI specifications and associated MIB file that affects this table. The table per the most recent specification and MIBs should only return data for 6 MHz equivalent channels that have active sub-carriers. At some point in the future, all modems should implement the table that way. Index 0 of the table is typically the 6 MHz channel that includes the PLC channel. The other indexes 1 to N, where N should be a max of 34, should all be containing active sub-carriers. FIG. 7 shows an example of a downstream RX Power MIP. As shown in FIG. 7, the channels that overlap the edges of the OFDM channel can report lower power than the ones in the middle of the channel. Similarly, a 6 MHz equivalent channel that overlaps an exclusion band can report lower power. For example, a 6 MHz band that has only 3 MHz of active sub-carriers can have 3 dB lower power values.

If there are two OFDM channels, this can be performed separately for each channel ifindex of type 277, which is part of the table index. The units for docsIf31CmDsOfdmChannelPowerRxPower are in Tenths-dBmV.

There is no way to discover exclusion bands and the modulation profile associated with the RX Power measurements directly from the modems 104 using standard management protocols. The exclusion bands can be identified from the CMTS 102, as described in Section 1.3 above if there are excluded channels included in the MIB that do not comply to the current specification. The DOCSIS specifications state that "If there are interior Exclusion Bands resulting in 6 MHz bands which contain no Active Subcarriers, then the indices corresponding to those bands will be skipped and the power for those bands will not be reported." As a result, in many embodiments, the network discovery analyzer 318 and NMS 214 are able to operate with missing band indices.

Band Index and Center Frequency can be calculated per the DOCSIS specification to have center frequencies calculated by centerfreq=111+6(n−1), where n can go from 1 to 185, so center frequencies go from 111 MHz to 1215 MHz.

Index 0 can be for the PLC channel, which will be at approximately the same power. Since the PLC channel can contain generally lower modulation than the 6 MHz equivalent channels containing the data sub-carriers, the PLC channel may warrant different thresholds. Since the PLC channel is a very important channel for modems to be able to register and receive MAC messages, it is worthwhile to know and highlight it specifically for issues.

In some embodiments, this MIB table for some older silicon-based modems can include rows that are not useful data for some 6 MHz segments. In some embodiments, if necessary for these modems, filtering the data can be performed to only include the rows that have active sub-carriers. To do this from the cable modem directly, collect at the same time the following objects from the docsIf31CmDsOfdmChanTable, assuming no exclusion bands in the active subcarriers are reported by the MIB:

docsIf31CmDsOfdmChanSubcarrierZeroFreq
docsIf31CmDsOfdmChanFirstActiveSubcarrierNum
docsIf31CmDsOfdmChanLastActiveSubcarrierNum
docsIf31CmDsOfdmChanSubcarrierSpacing Next, calculate the following derived metrics:

LowRxPwrFreq=docsIf31CmDsOfdmChanSubcarrier
   ZeroFreq+docsIf31CmDsOfdmChanSubcarrier
   Spacing*1000*docsIf31CmDsOfdmChanFirstActive
   SubcarrierNum−docsIf31CmDsOfdmChan Subcarrier-
   Spacing*500
HiRxPwrFreq=docsIf31CmDsOfdmChanSubcarrierZero
   Freq+docsIf31CmDsOfdmChanSubcarrierSpacing*
   1000*docsIf31CmDsOfdmChanLastActiveSubcarrier
   Num+
   docsIf31CmDsOfdmChanSubcarrierSpacing*500

For modems that have implemented the latest ECNs in the DOCSIS 3.1 specification:

{RXPwrSet}={for each docsIf31CmDsOfdmChannelBandIndex>0 include docsIf31CmDsOfdmChannelPowerRxPower/10 in the set}

For modems that have not yet implemented the latest ECNs in the DOCSIS specification:

{RXPwrSet}={for each docsIf31CmDsOfdmChannelBandIndex>0 WHERE LowRxPwrFreq<docsIf31CmDsOfdmChannelPower CenterFrequency<HiRxPwrFreq include docsIf31CmDsOfdmChannelPowerRxPower/10 in the set}

The {RxPwrSet} can include all of the 6 MHz equivalent power measurements for the OFDMA channel containing active sub-carriers in units translated to dBmV.

2.2.2 MER Mapping to RxPower 6 MHz Frequency Boundaries

The MER can be reported in the PNM (Proactive Network Maintenance) file and can include the MER value for each sub-carrier in units of ¼ dB with values clamped to the range of 0 to 63.5 dB. Unmodulated sub-carriers such as those in exclusion zones or guard bands can report 0xFF indicating no value and should be filtered from the set. The header of the file can include the information that can be used to convert the sub-carrier indexes to frequencies including SubcarrierZeroFrequency in Hz, FirstActiveSubcarrierIndex, SubcarrierSpacing in kHz. The center frequency of the first subcarrier is:

SubcarrierZeroFrequency/1,000,000
   FirstActiveSubcarrierIndex*SubcarrierSpacing/1,000.

In many embodiments, the incremental sub-carrier index center frequencies can then be calculated by knowing each is SubcarrierSpacing/1,000 wide in MHz. Note, to match up exactly to the RxPower channels which also report a center frequency, the sub-carriers and RxPower frequencies can be converted to an edge frequency. These can be converted by the sub-carrier center frequency+/−SubcarrierSpacing/1,000/2, and for RxPower, the 6 MHz equivalent channel center frequency+/−3 MHz. They may not lineup exactly at the same frequency in Hz, so a sub-carrier that covers across an RxPower 6 MHz equivalent channel edge is included in that 6 MHz channel on either side can be assumed.

In several embodiments, to calculate the MER level for the 6 MHz segment, a minimum, maximum, or average/mean can be applied. For example, to keep things simple and not too conservative or aggressive, the mean can be taken of the MER of the subcarriers in the 6 MHz band and can be used as the MER for the 6 MHz equivalent channel. As the network profile designer 322 calculates profiles based on this data, it can take a conservative approach across the modems 104 in the group as is done with the modulation mapping in the next section. Note that alternative or additional metrics instead of or in addition to mean MER can be used, such as Mean−StdDev, or 9th percentile, among others that are available from the network to further customize or optimize the solution.

2.2.3 Mapping of Modulation and Sub-Carrier Type to a 6 MHz Channel

The modulation per sub-carrier band is described above in Section 1.2. In many embodiments, the network profile designer 322 may map the modulation per sub-carrier band information from a band to the individual sub-carriers to the frequency spectrum using the information about the subcarrierZeroFreq, FirstActiveSubcarrier, and SubcarrierSpacing, as described above. Alternatively, the band can be converted to an edge frequency using techniques previously described and then mapped to 6 MHz equivalent channels. Because an RxPower measurement band can include sub-carriers that have different modulation, to meet the format of Table 2, an aggregation function can be used to identify a specific modulation for that 6 MHz equivalent channel. Assuming the modulation of that 6 MHz equivalent channel is the MAX of the modulation values that are contained in it for a specific profile, this is one conservative approach when comparing to the MER and RxPower for this band. Another approach is to calculate a weighted modulation level for the band to use as part of the Profile Design Controller component and Profile Assigner component of the D3.1 PMA.

For SubcarrierType, if the channel includes a data subcarrier, it can be considered a data type. If it includes only exclusion zone type, it can be considered an exclusion type 6 MHz equivalent channel. Because the PLC and continuous pilots are smaller than a 6 MHz equivalent channel, at this spectrum resolution it is not likely, or and in most cases even possible, that a 6 MHz channel will occur that only contains PLC or/and pilot subcarriers. Performing this same analysis on a sub-carrier by sub-carrier basis yields valuable information.

3. Profile Design 3.1 Grouping Analysis

In many embodiments, based on the data shown in Table 2 for each cable modem 104 on the channel, in many embodiments, a customized profile (e.g., an optimized profile or other customized profile) can be designed that can support each of the modems 104 on the channel. Since more than one of the modems 104 will use a single profile, the challenge of a grouping function is to determine how many and which modems 104 can effectively use the same profile.

While the CMTSs 102 should support up to 16 profiles per OFDM channel, many CMTSs 102 may not support that many. If the number of modems 104 on an OFDM channel is less than the number of profiles available, the network profile designer 322 can design a profile per modem. If the number of D3.1 CMs 104 is more than the number of profiles supported, or if the latency and negative efficiency impacts drive the operator to want to reduce the number of profiles, then a grouping of CMs 104 who can use a common profile can be calculated.

In various embodiments, there are a variety of techniques that can be used for grouping, including:

Machine Learning (ML) unsupervised learning exclusive clustering algorithms, such as k-means. These algorithms can be based on either the network metrics from Table 2 or the bit loading profiles for each CM 104 after the customized profile is designed for each CM 104.

A ML based fuzzy overlapping clustering with membership values to identify multiple near distance profiles that may be appropriate for the modem, and then assign the modem to either, based on performance over time. A probability of packet loss as a distance metric could be incorporated as a part of a fuzzy grouping approach.

Execute a ML hierarchal clustering approach until the number of clusters is equal to the number of available profiles.

Develop a simple general high, medium, and low profile and calculate a Euclidian distance from each modems ideal profile, and then iterate the profile to optimize its design for the group.

A simple ranking algorithm based on the optimal profile for each CM and uniform distribution into profiles.

Brute force approach to evaluate all possible clusters of modems.

Hybrid approaches of the above to group that cluster using a first method and then refine clusters using a second method.

The examples in the design below include a ML algorithm or a ranking and uniform distribution as examples. A goal may be to determine an algorithm that works well based on empirical network data. Along with the grouping function tracking of metrics to identify the effectiveness of the grouping, the overall total system capacity of the profiles, and the effectiveness of profiles per CM can be tracked.

3.2 Profile Definition

Figure 8:
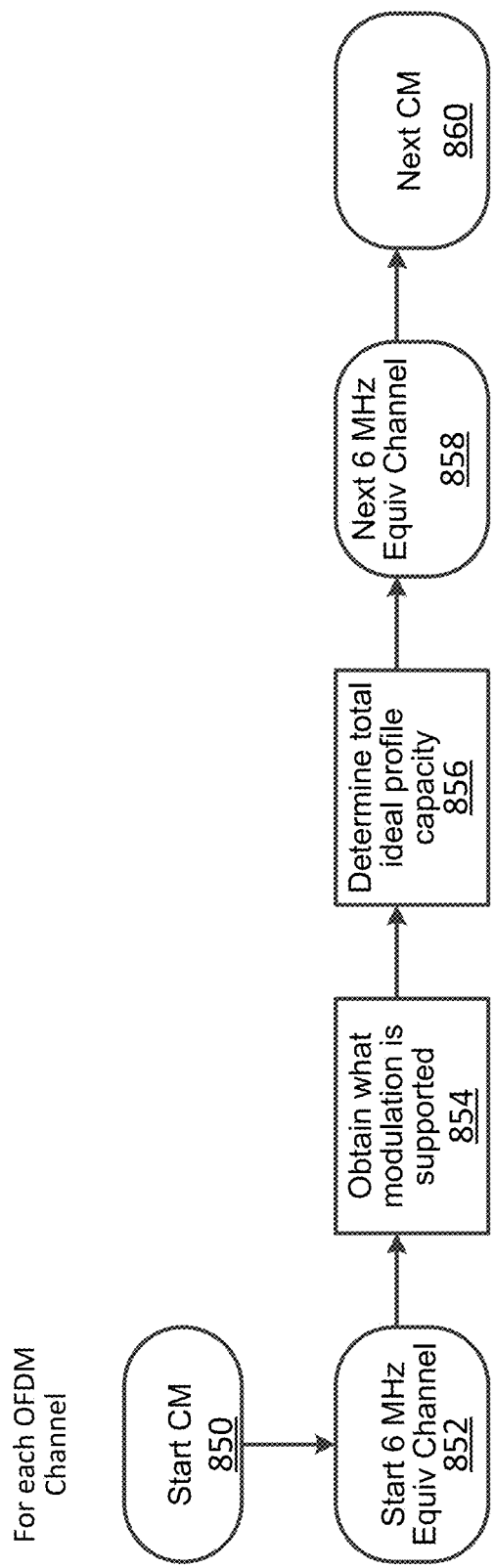
FIG. 8 is a flowchart depicting an exemplary procedure for profile determination.
Figure 9:
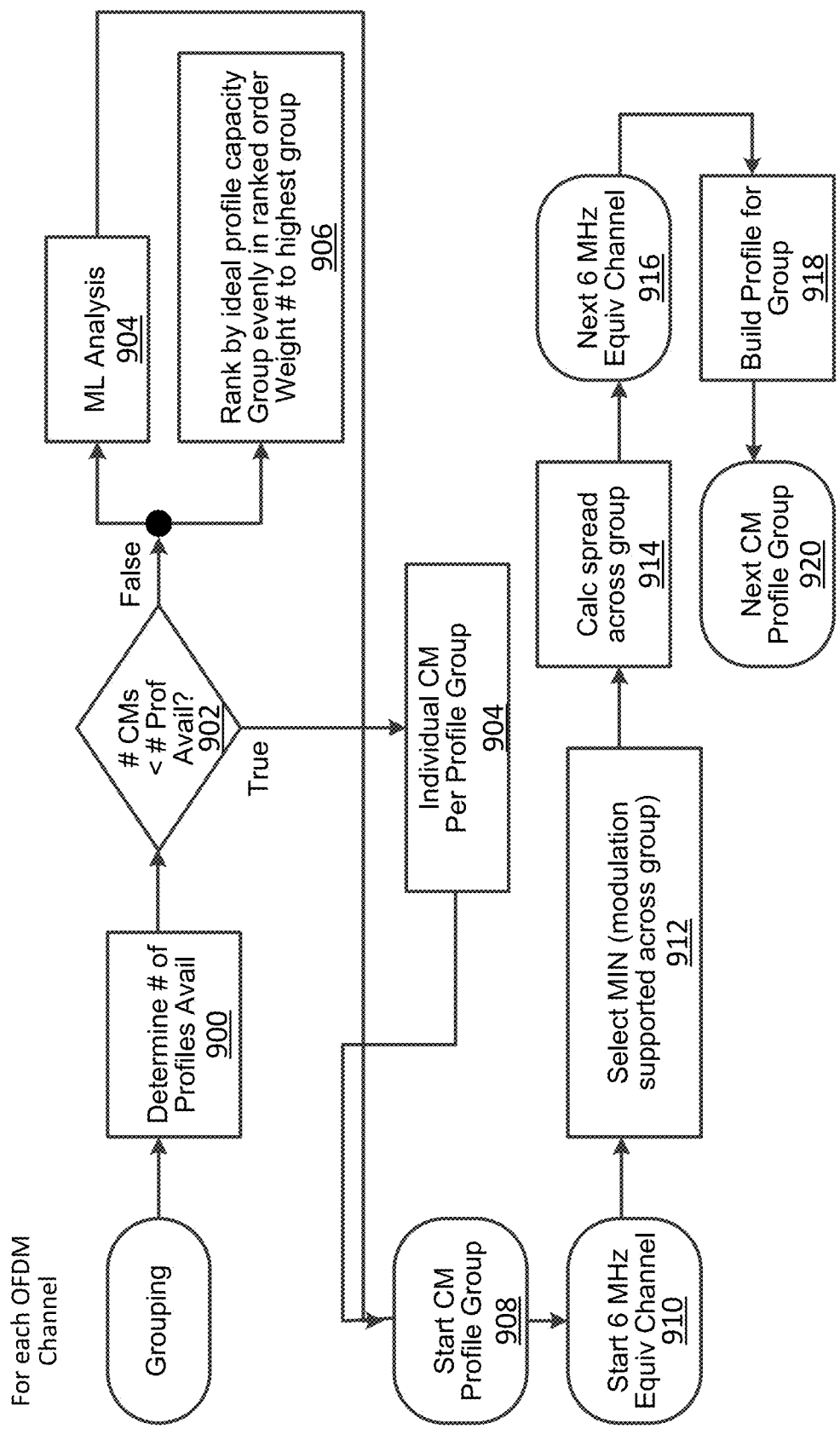
FIG. 9 is another flowchart depicting an exemplary grouping procedure.

FIG. 8 illustrates a flow diagram for an exemplary procedure for profile calculation, and FIG. 9 depicts an exemplary procedure for grouping. The profile and grouping procedures of FIGS. 8 and 9 are merely exemplary and the embodiments presented herein are not limited to traversing these procedures. Grouping and profile calculation can be employed in many different embodiments or examples not specifically depicted or described herein. Different algorithms can be run on empirical data sets to measure the performance of the algorithm, and how well it optimizes the overall capacity and customer experience QoE metrics. Although the example algorithm makes some conservative approaches, such as the minimum modulation supported by the CMs 104 in the group, alternatively more aggressive approaches can be taken such as an average, or an alternating modulation across the band of interest based on a priori knowledge of the interleaving and FEC approach that can resolve some of the errors resulting from the aggressive higher capacity profile design. Exemplary pseudocode is shown below, but the procedure can be implemented in other suitable way.

As shown in FIG. 8 and represented by the pseudo code below, the profile determination may be an iterative process performed for each OFDM channel, for each CM 102 on the channel. And as shown in FIG. 9 and represented by pseudocode below, grouping is also an iterative process performed for each profile group.

```
Pseudo-Code Corresponding to FIG. 8
MaxNumProfOfdmChan = 4 // This number will be set by CMTS capabilities, it
            will be less than 15 per spec
For each OFDM channel Do
D31Count(ifIndex)=0
   For each D3.1 CM Do (Blocks 850 and 860)
      IdealProfCapacity(ifIndex,CM) = 0
      D31Count(ifIndex)++ //adds up number of CMs on channel
         For each 6 MHz equivalent Channel Do (Blocks 852 and 858)
            CM_Mod_Potential(ifIndex,CM,6MChfreq) = Lookup potential best
               modulation from Table 3 for this band for this CM (Block
               854)//Use the bps/Hz number
            IdealProfCapacity(ifIndex,CM) = IdealProfCapacity(ifIndex,CM) +
               CM_Mod_Potential(ifIndex,6MChfreq) (Block 856)//accumulates
               the bpsHz number for each 6 MHz to a total for the profile
               for the channel for the CM. The goal of optimization is to
               show this ideal profile capacity for the channel is as high
               as possible across all profiles after grouping. The per CM
               metric can be compared a grouped metric to quantify how
               effective the grouping is and how effective the
               optimization is.
      Done
   Done
Pseudo-Code Corresponding to FIG. 9
MaxNumProfOfdmChan-1 = Number of profiles available (Block 900)
   If D31Count(ifIndex) <= (MaxNumProfOfdmChan-1)(Block 902) Then //Calculate
            a simple profile for each CM (Block 904) because # of CMs
            is less than # of profiles
      Build a bit loading profile with 6 MHz bands equal to the modulation
            indicated by CM_Mod_Potential (ifIndex,CM,6MChfreq)
      Generate cli or REST commands needed to do CRUD based on the current
            profiles and send to new profile recommendation pool.
   Else (Blocks 904 and 906) // a more complex grouping is required to fit
            the modems into a smaller number of profiles, use k-means,
            Fuzzy, hybrid or simple algorithm below
      NumCmPerProf = Ceiling(D31Count(ifIndex)/ (MaxNumProfOfdmChan-1),1)
Rank order CMs by IdealProfCapacity(ifIndex,CM) highest to lowest // if all
            CMS have same # than only one group needed, or if less
            unique numbers than profiles, than less than total profiles
            needed
      Bin CMs into (MaxNumProfOfdmChan-1) equal profile groups, and the max
            number in any profile group should be NumCmPerProf with the
            bin corresponding to the highest idealProfCapacity group of
            modems with NumCmPerProf, and second highest group next,
            until you have as balanced number of modems in bins as
            possible.
      For each CMProfileGroup Do (Blocks 908 and 920)
         For each 6 MHz equivalent Channel Do (Blocks 910 and 916)
            NewProfModulation(CMProfileGroup,6MChfreq) =
               MIN(CM_Mod_Potential(ifIndex,CM,6MChfreq))(Block 912)
               //This could be a MEAN or other calculation such as
               effective alternating subcarriers instead of a MIN, but MIN
               is more conservative
            SpreadProfModulation(CMProfileGroup,6Mchfreq)=
               MAX(CM_Mod_Potential(ifIndex,CM,6MChfreq)) -
               NewProfModulation(CMProfileGroup,6MChfreq) (Block 914)
               //This is just to track for each 6 MHz equivalent channel
               how wide a spread of optimal bit loadings there are,
               additional analytics can be created from this, for example
               if the spread really wide, it may not be the optimal group.
               Or, conversely if the spread is consistently 0 or really
               small than it is a very good group. We can calculate even
               if we group by the ML
         Done
         Build a bit loading profile with 6 MHz bands equal to the
               modulation indicated by
               NewProfModulation(CMProfileGroup,6MChfreq)(Block 918)
      Generate cli commands needed to do CRUD based on the current profiles and
               send to new profile recommendation pool. See profile
               controller section for how to do updates.
      Done
   Endif
Done
```

In several embodiments, a table can be used store MER values used to support modulation (bit-loading field). For example, Table 3 below stores MER values used to support modulation (bit-loading field). Table 3 can be updated based on lab testing and empirical evidence. In many embodiments, when the lookup is done in the algorithm above, the highest order modulation can be selected for which both the RX Power and MER fall within greater than the values in the table. Note that the numbers in Table 3 are exemplary and can be made more aggressive or more conservative based on empirical evidence.

TABLE 3

| Modulation (bits/Hz) | RxP <−15 | −15 >= RxP < −12 | −12 >= RxP < −9 | −9 >= RxP < −6 | −6 >= RxP < 0 | RxP >=0 |
|---|---|---|---|---|---|---|
| 4096 (12) | NA | NA | 39 | 38.5 | 38 | 38 |
| 2048 (11) | NA | NA | 37.5 | 35.5 | 34.5 | 34.5 |
| 1024 (10) | NA | 32 | 32 | 31.5 | 31.0 | 31.0 |
| 512 (9) | NA | 30.5 | 29 | 28.5 | 28 | 28 |
| 256 (8) | 27.5 | 27.0 | 26.5 | 26 | 26 | 26 |
| 128 (7) | 24.0 | 23.5 | 23.5 | 23.0 | 23.0 | 23.0 |
| 64 (6) | 21.0 | 20.5 | 20.5 | 20.0 | 20.0 | 20.0 |
| 16 (4) | 15 | 14.5 | 14.5 | 14.0 | 14.0 | 14.0 |

Once this new set of profiles is calculated for the interfaces, then the CM Profile Assignment can be performed.

4. Profile Control 4.1 Vendor Abstraction

As described above, a software layer using an SDN technique that allows abstraction and normalization across different vendor implementations is a novel and useful part of the disclosure. For example, if CMTS vendor A supports the standard management instrumentation, and vendor B only supports a proprietary CLI (command-line interface) configuration the software can operate as if all infrastructure will support the standards with a vendor abstraction layer that can be implemented below the standard interface to abstract the special treatment from the rest of the system.

4.2 Protocol Translation

Because there are different interfaces and protocols that may be used across different access network infrastructure, in many embodiments, the system can translate from standard implementations to those that support the standards. Additionally, network management standards are evolving. While one CMTS may support a standard SNMP interface and a proprietary CLI, another newer CMTS may support a RESTful interface for configuration based on a YANG data model. Being able to have a protocol abstraction layer as part of the SDN plugins can enable effective evolution to newer management protocols. In addition to standard interfaces with well-defined protocols, this could include methods such as a TCL (Tool Command Language) or expect script to program a proprietary CLI.

4.3 CMTS Profile Configuration

A CMTS may support 16 profiles per OFDM channel, or may only support 2 or 3 profiles. With a smaller number of possible profiles, the Create, Read, Update, and Delete (CRUD) functions for profiles can become more complicated. In many embodiments, the system can adapt to seamlessly update profiles. For example, in some embodiments, one or more of the following approaches and/or functionality can be implemented:

1. Where sufficient unused profiles are available, update unused profile definitions, then assign new profile definitions to channels, assign CMs to new profiles, then delete old unused profile definitions from CMTS when CMs have all been successfully moved.
2. Where all profiles are currently in use, modems can be moved to the profile "A" or profile 0, which should support all modems, then existing profiles can be changed, then modems moved back to best matching profiles. Separation of CM profile assignment from CM profile design functions can enable seamless CRUD operations.
3. In some cases, modems can remain on the current profile through the re-definition of the profile, if the modems will be effectively supported by the new profile definition, while other modems can be moved to Profile "A" or a more robust profile while the new profiles are implemented.
4. Some operations can allow some profiles to be changed, and other profiles to remain unchanged and modems can be moved or remain as part of the update to the CMTS configuration.
5. Algorithms that optimize the CRUD operations by selecting a hybrid method of the above approaches with the fewest move or change operations can be utilized to ensure stability and effective customer QoE.
6. Different infrastructure can support different configuration capabilities. Building the software using SDN principles and abstraction layers, such as described herein, can enable normalization across infrastructure vendors and the configuration protocols supported.
7. To provide system stability, each step of configuration can be validated. As one exemplary process CMTS, the following actions can be performed. in some embodiments, the CMTS can support a more seamless method. In many embodiments, the configuration can be verified that it was configured correctly after one or more of the actions, of alternatively, after each action, is performed.
   a. Upon request to configure a new profile:
      i. Shutdown interface/Channel if required by CMTS. In other embodiments, modems remain online.
      ii. Enter CLI configuration mode and move to the specific channel configuration.
      iii. Set the default modulation for the profile.
      iv. Set the exception bands to the default modulation.
      v. Show the configuration to verify it matches the expected new configuration, if not re-implement the configuration.
      vi. Enable the interface.
      vii. Show the running profile and verify that it matches the intended profile.
      viii. Verify all the modems have re-connected to the channel.
      ix. Re-assign modems to correct profile as needed.

5. CM Profile Assignment

After profiles are generated (Block 510)(FIG. 5), each of the cable modems 104 is assigned to one of the plurality of profiles (Block 512). The assignment of modems to profiles is described as a separate process than the new profile calculations because there can be existing profiles that work acceptably for modems better than the newly calculated ones, and the rate of profile calculation and change can be much slower due to CMTS 102 implementation requiring interface shutdowns or gaps in traffic forwarding, among other factors. This could be especially true in the future as there are a growing number of DOCSIS 3.1 modems using the existing profiles. In many embodiments, CM movement between active profiles can happen at a potentially higher rate than new profile definitions. Alternatively, to simplify things, as a new profile is calculated for the bin of CMs 104 with similar potential, a modem can be marked for movement at the assignment stage. As discussed above, separating the assignment from the profile design can be a useful architectural approach to allow for normalization across different vendor behaviors.

Figure 10:
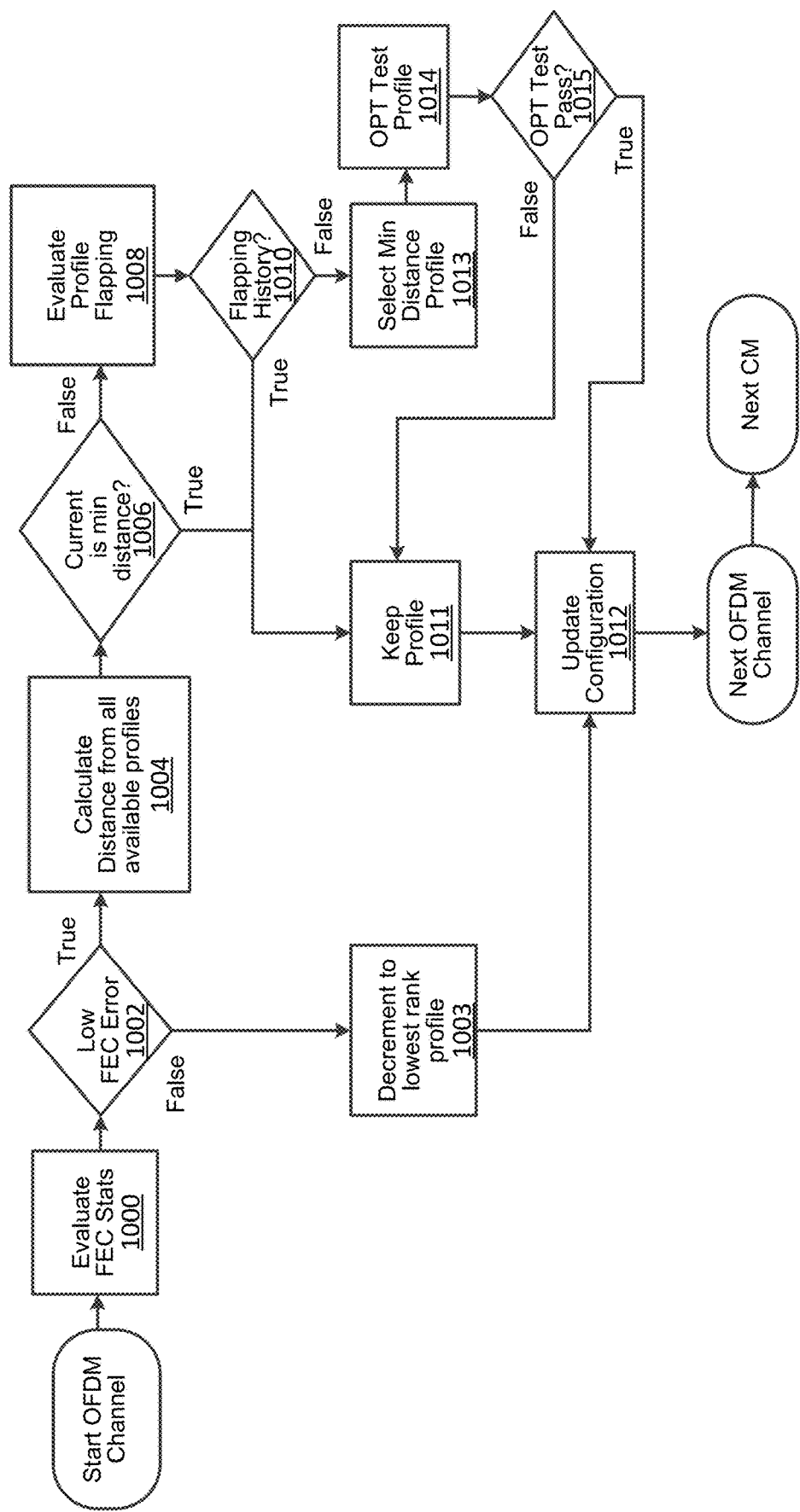
FIG. 10 is yet another flowchart depicting an exemplary profile assignment procedure.

Turning ahead in the drawings, FIG. 10 illustrates an exemplary profile assignment procedure. The profile assignment procedure of FIG. 10 is merely exemplary and is not limited to the embodiments presented herein. Profile assignment can be employed in many different embodiments or examples not specifically depicted or described herein. In many embodiments, to calculate which profile to assign a modem to, data can be formed similar to Table 2, and the procedure shown in FIG. 10 can be performed for each modem on the OFDM interface. In many embodiments, the distance metric can be based on bit/Hz in the band of interest, or based on an overall probability of packet loss type measure. In several embodiments, the CM profile assignment can map individual device configurations into profiles, which can be used to control the configuration settings (e.g., modulation settings) on the broadband network devices.

The examples below describe evaluations and/or metrics that can be performed and/or determined, in various embodiments, using the procedure in FIG. 10. Different metrics can result in different assignments with a customized metric (e.g., an optimized metric or other customized metric) determined by testing of empirical data sets. As shown, initially FEC statistics are evaluated (Block 1000), then

- Low FEC errors is a FEC calculation resulting in less than X %, and X is chosen based on the probability of 1% Packet loss or other similar performance threshold (Block 1002). These stats can be obtained from the DOCSIS 3.1 FEC stats test. If low FEC error condition is determined, then opportunity for profile optimization or customization exists.
- If a condition of low FEC errors is not found, then there does not exist an opportunity for profile optimization or customization, and the CM is assigned to a more robust profile (Block 1003).
- The distance may be calculated by evaluating the CM_Mod_Potential(ifIndex, CM, 6MChfreq) as described in the pseudo code above and based on Table 3 thresholds for the latest CM data formed as in Table 2 for each 6 MHz equivalent channel, and take the ABS(bits/Hz) supported minus the bits/Hz of the profile). In some embodiments, MER and RxPower statistics can be evaluated over time to reduce flapping if there is a high incidence of flapping if the latest value would typically result in an adjustment (Block 1004).
- Determine if the current profile satisfies the threshold for minimum distance (Block 1006). Once each available profile on the channel is evaluated, determine if the modems current profile is the best fit, or if there is a better one.
  - Accumulate the distance metric for the channel and profile groups to create a historical metric on the quality of the grouping function and performance of the optimization algorithm.
- Before assigning a CM to an optimized or customized profile, check that the modem is not flapping (Blocks 1008 and 1010). Profile "flapping" can be evaluated based on whether the modem is changing profiles at a rate greater than X times per day. X can be a variable chosen based on empirical experience with initial settings of X=1 to 6. The flapping threshold can be tuned based on evaluated data and the level of potential disruption or impact to QoE. This check on assignment can beneficially avoid degrading customer experience or CMTS efficiency created by too frequent profile changes that may not be necessary.
- If it is determined that a "profile flapping" condition exists (Block 1010) then the current profile for the CM is kept (Block 1011) and the updates to configuration do not include profile customizations or optimizations (1012). However, if "profile flapping" does not exist, then a new customized and optimized profile is selected for the CM (Block 1013).
- DOCSIS 3.1 can allow the performance of a profile to be evaluated using the MAC layer OFDM Profile Test (OPT) message before becoming the active profile for the modems packets. Running an OPT evaluation before committing the selected customized or optimized profile assignment can increase the probability of successful profile adoption (Block 1014). If the OPT evaluation passes, then the selected profile is assigned (Block 1012). However, if the OPT evaluation fails, then the CM's updated configuration does not include the selected profile.

Figure 11:
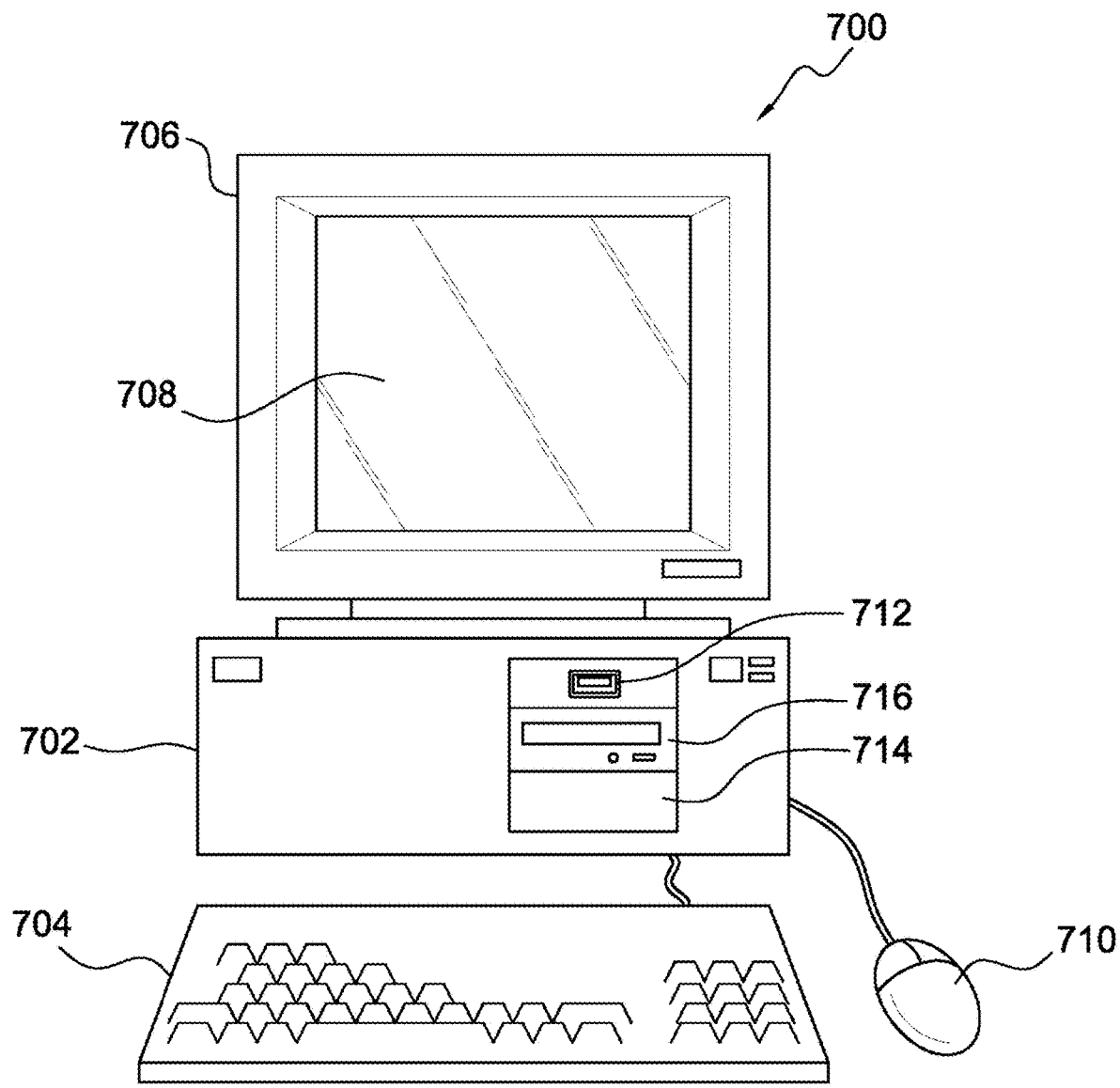
FIG. 11 illustrates a computer that may be used to implement aspects described herein.

Turning ahead in the drawings, FIG. 11 illustrates a computer 700, all of which or a portion of which can be suitable for implementing broadband profile management, as described herein. For example, the SDN Network Controller, NMS, and PMA can be include or be implemented on a computer, such as computer 700. Computer 700 includes a chassis 702 containing one or more circuit boards (not shown), a USB (universal serial bus) port 712, a Compact Disc Read-Only Memory (CD-ROM) and/or Digital Video Disc (DVD) drive 716, and a hard drive 714. A representative block diagram of the elements included on the circuit boards inside chassis 702 is shown in FIG. 8. A central processing unit (CPU) 810 in FIG. 8 is coupled to a system bus 814 in FIG. 8. In various embodiments, the architecture of CPU 810 can be compliant with any of a variety of commercially distributed architecture families.

Figure 12:
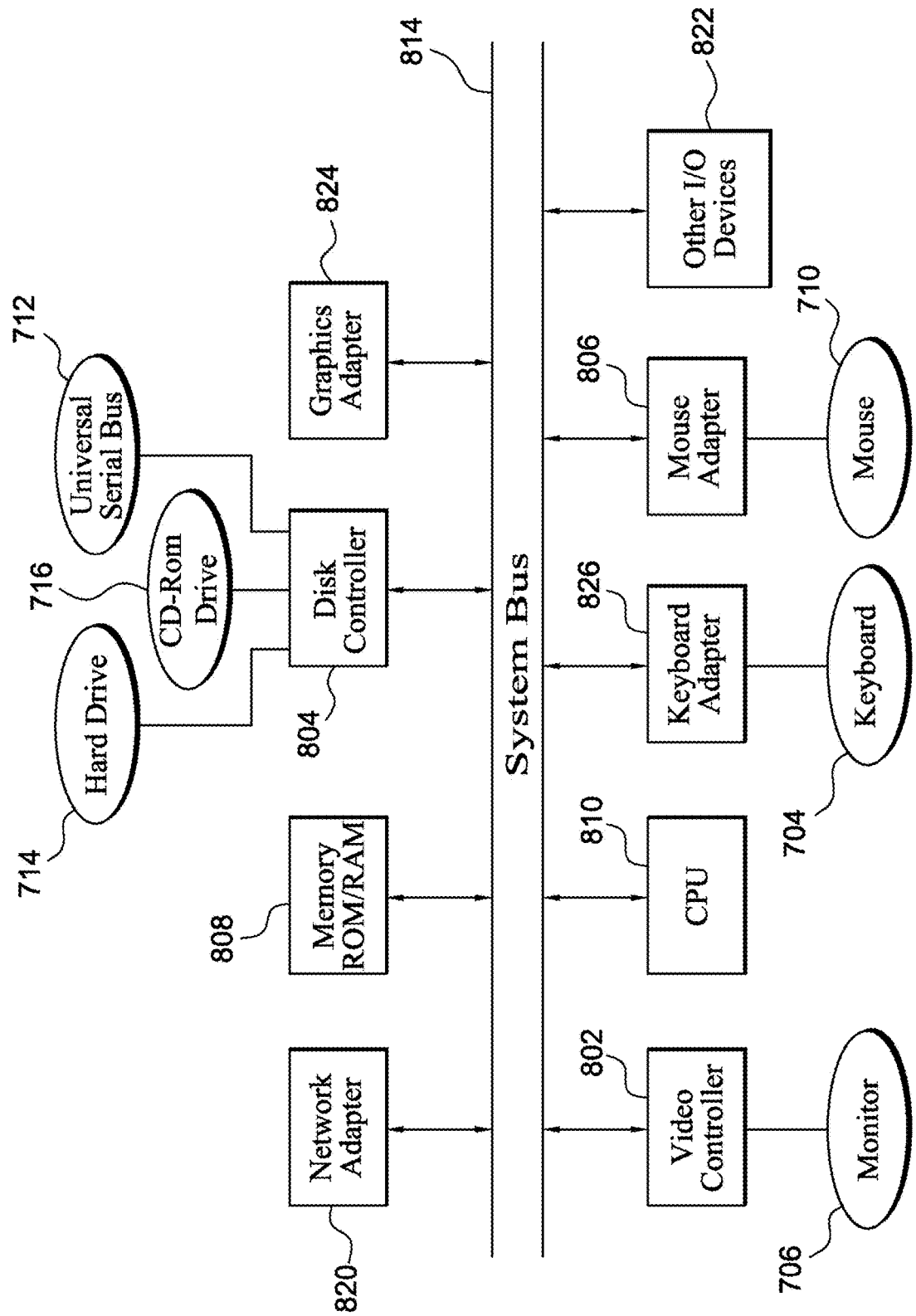
FIG. 12 is a diagram depicting processing components that may be used by the computer depicted in FIG. 11.

Continuing with FIG. 12, system bus 814 also is coupled to memory 808 that includes both read only memory (ROM) and random access memory (RAM). Non-volatile portions of memory storage unit 808 or the ROM can be encoded with a boot code sequence suitable for restoring computer 700 (FIG. 11) to a functional state after a system reset. In addition, memory 808 can include microcode such as a Basic Input-Output System (BIOS). In some examples, the one or more memory storage units of the various embodiments disclosed herein can comprise memory storage unit 808, a USB-equipped electronic device, such as, an external memory storage unit (not shown) coupled to universal serial bus (USB) port 712 (FIGS. 11-12), hard drive 714 (FIGS. 11-12), and/or CD-ROM or DVD drive 716 (FIGS. 11-12). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 810.

In the depicted embodiment of FIG. 12, various I/O devices such as a disk controller 804, a graphics adapter 824, a video controller 802, a keyboard adapter 826, a mouse adapter 806, a network adapter 820, and other I/O devices 822 can be coupled to system bus 814. Keyboard adapter 826 and mouse adapter 806 are coupled to a keyboard 704 (FIGS. 11 and 12) and a mouse 710 (FIGS. 11 and 12), respectively, of computer 700 (FIG. 11). While graphics adapter 824 and video controller 802 are indicated as distinct units in FIG. 12, video controller 802 can be integrated into graphics adapter 824, or vice versa in other embodiments. Video controller 802 is suitable for refreshing a monitor 706 (FIGS. 11 and 12) to display images on a screen 708 (FIG. 11) of computer 700 (FIG. 11). Disk controller 804 can control hard drive 714 (FIGS. 11 and 12), USB port 712 (FIGS. 11 and 12), and CD-ROM or DVD drive 716 (FIGS. 11 and 12). In other embodiments, distinct units can be used to control each of these devices separately.

In some embodiments, network adapter 820 can comprise and/or be implemented as a WNIC (wireless network interface controller) card (not shown) plugged or coupled to an expansion port (not shown) in computer system 700 (FIG. 11). In other embodiments, the WNIC card can be a wireless network card built into computer system 700 (FIG. 11). A wireless network adapter can be built into computer system 700 (FIG. 11) by having wireless communication capabilities integrated into the motherboard chipset (not shown), or implemented via one or more dedicated wireless communication chips (not shown), connected through a PCI (peripheral component interconnector) or a PCI express bus of computer system 700 (FIG. 11) or USB port 712 (FIG. 11). In other embodiments, network adapter 820 can comprise and/or be implemented as a wired network interface controller card (not shown).

Although many other components of computer 700 (FIG. 11) are not shown, such components and their interconnection are well known to those of ordinary skill in the art. Accordingly, further details concerning the construction and composition of computer 700 and the circuit boards inside chassis 702 (FIG. 11) need not be discussed herein.

When computer 700 in FIG. 11 is running, program instructions stored on a USB drive in USB port 712, on a CD-ROM or DVD in CD-ROM and/or DVD drive 716, on hard drive 714, or in memory 808 (FIG. 12) are executed by CPU 810 (FIG. 12). A portion of the program instructions, stored on these devices, can be suitable for carrying out all or at least part of the techniques described herein. In various embodiments, computer 700 can be reprogrammed with one or more modules, applications, and/or databases to convert a general purpose computer to a special purpose computer. For purposes of illustration, programs and other executable program components are shown herein as discrete systems, although it is understood that such programs and components may reside at various times in different storage components of computer 700, and can be executed by CPU 810. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 700 is illustrated as a desktop computer in FIG. 11, there can be examples where computer system 700 may take a different form factor while still having functional elements similar to those described for computer system 700. In some embodiments, computer system 700 may comprise a single computer, a single server, or a cluster or collection of computers or servers, or a cloud of computers or servers. Typically, a cluster or collection of servers can be used when the demand on computer system 700 exceeds the reasonable capability of a single server or computer. In certain embodiments, computer system 700 may comprise a portable computer, such as a laptop computer. In certain other embodiments, computer system 700 may comprise a mobile device, such as a smartphone. In certain additional embodiments, computer system 700 may comprise an embedded system.

Although broadband profile management has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-12 may be modified, and that the foregoing discussion of certain of these embodiments does not necessarily represent a complete description of all possible embodiments. For example, one or more of the procedures, processes, or activities of FIGS. 5 and 8-10 may include different procedures, processes, and/or activities and be performed by many different modules, in many different orders, and/or one or more of the procedures, processes, or activities of FIGS. 5 and 8-10 may include one or more of the procedures, processes, or activities of another different one of FIGS. 5 and 8-10.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled" and the like does not mean that the coupling, etc., in question is or is not removable.

What is claimed is:

1. A system for performing broadband profile management in a cable network that provides data services to a plurality of cable modems with a cable modem termination System (CMTS), the system including:
   a network data collector configured to establish a network connection with the CMTS;
   a network discovery analyzer configured to:
      discover OFDM channels utilized by the CMTS, each of the channels including a plurality of OFDM subcarriers; and
      discover a current set of profiles for the cable network, each of the profiles defining a modulation order for each of the plurality of OFDM subcarriers in each OFDM channel;
   a network performance analyzer configured to discover signal quality values for the cable network;
   a network profile designer configured to:
      obtain signal quality values for the plurality of OFDM subcarriers to generate a mapping between the signal quality values and the OFDM subcarriers; and
      generate a plurality of profiles based upon the mapping between the signal quality values and the OFDM subcarriers; and
   a profile controller configured to assign each of the cable modems to one of the plurality of profiles.

2. The system of claim 1, wherein the network data collector is configured to remotely establish the network connection with the CMTS via an internet protocol (IP) network.

3. The system of claim 1, wherein the network discovery analyzer is configured to obtain configuration information for the cable network including exclusion band and non-data subcarriers.

4. The system of claim 1, wherein the network discovery analyzer is configured to discover OFDM channels by accessing a docsIf31CmtsDsOfdmChanTable.

5. The system of claim 1, wherein the network discovery analyzer is configured to discover the current set of profiles for the cable network by accessing a docsIf31CmtsDsOfdmSubcarrierStatusTable and a docsIf31CmtsDsOfdmSubcarrierTypeTable.

6. The system of claim 1, wherein the network discovery analyzer is configured to discover a current set of profiles for the cable network by accessing a docsIf31CmDsOfdmProfileStatsTable.

7. The system of claim 1, wherein the network discovery analyzer is configured to discover a current set of profiles for the cable network by accessing a docsIf31CmtsCmRegStatusDsProfileIdList.

8. The system of claim 1, wherein the network discovery analyzer is configured to generate a topology mapping between a specific OFDM channel ifIndex and downstream channel Id (DCID).

9. The system of claim 1, wherein the network profile designer is configured to:
   channelize subcarriers of each of the OFDM channels into bands of subcarriers; and
   obtain the signal quality values to the plurality of OFDM subcarriers by mapping a signal quality value to each of band of subcarriers.

10. The system of claim 9, wherein each band is 6 MHz.

11. The system of claim 1, wherein the signal quality data includes at least one of: codeword error data, modulation error ratios for the subcarriers, and power data that indicates power levels of communications between the cable modems and the CMTS.

12. A method for performing broadband profile management in a cable network providing data services to a plurality of cable modems, the method comprising:
   establishing a network connection with a cable modem termination System (CMTS);
   discovering OFDM channels utilized by the cable network, each of the channels includes a plurality of OFDM subcarriers;
   discovering a current set of profiles for the cable network, each of the profiles defining a modulation order for each of the plurality of OFDM subcarriers in each OFDM channel;
   obtaining signal quality values for the plurality of OFDM subcarriers to generate a mapping between the signal quality values and the OFDM subcarriers;

generating a plurality of profiles based upon the mapping between the signal quality values and the OFDM subcarriers; and assigning each of the cable modems to one of the plurality of profiles.

13. The method of claim 12, wherein establishing the network connection includes remotely establishing the connection with the CMTS.

14. The method of claim 12 including obtaining configuration information for the cable network including exclusion band information and non-data subcarrier information.

15. The method of claim 12, wherein discovering OFDM channels includes accessing docsIf31CmtsDsOfdmChanTable.

16. The method of claim 12, wherein discovering a current set of profiles for the cable network includes accessing a docsIf31CmtsDsOfdmSubcarrierStatusTable and a docsIf31CmtsDsOfdmSubcarrierTypeTable.

17. The method of claim 12, wherein discovering a current set of profiles for the cable network includes accessing a docsIf31CmDsOfdmProfileStatsTable.

18. The method of claim 12, wherein discovering a current set of profiles for the cable network includes accessing a docsIf31CmtsCmRegStatusDsProfileIdList.

19. The method of claim 12, wherein discovering a current set of profiles for the cable network includes generating a topology mapping between a specific OFDM channel ifIndex and downstream channel Id (DCID).

20. The method of claim 12 including:
channelizing subcarriers of each of the OFDM channels into bands of subcarriers;
wherein obtaining the signal quality values for the plurality of OFDM subcarriers includes mapping a MER value to each of band of subcarriers.

21. The method of claim 20, wherein each band is 6 MHz.

22. A non-transitory computer-readable media comprising instructions for performing a broadband profile management method in a cable network that provides data services to a plurality of cable modems, the method comprising:
establishing a network connection with a cable modem termination System (CMTS);
discovering OFDM channels utilized by the cable network, each of the channels includes a plurality of OFDM subcarriers;
discovering a current set of profiles for the cable network, each of the profiles defining a modulation order for each of the plurality of OFDM subcarriers in each OFDM channel;
obtaining signal quality values for the plurality of OFDM subcarriers to generate a mapping between the signal quality values and the OFDM subcarriers;
generating a plurality of profiles based upon the mapping between the signal quality values and the OFDM subcarriers; and
assigning each of the cable modems to one of the plurality of profiles.

23. The non-transitory computer-readable media of claim 22, wherein establishing the network connection includes remotely establishing the connection with the CMTS.

24. The non-transitory computer-readable media of claim 22 including obtaining configuration information for the cable network including exclusion band information and non-data subcarrier information.

25. The non-transitory computer-readable media of claim 22, wherein discovering OFDM channels includes accessing docsIf31CmtsDsOfdmChanTable.

26. The non-transitory computer-readable media of claim 22, wherein discovering a current set of profiles for the cable network includes accessing a docsIf31CmtsDsOfdmSubcarrierStatusTable and a docsIf31CmtsDsOfdmSubcarrierTypeTable.

27. The non-transitory computer-readable media of claim 22, wherein discovering a current set of profiles for the cable network includes accessing a docsIf31CmDsOfdmProfileStatsTable.

28. The non-transitory computer-readable media of claim 22, wherein discovering a current set of profiles for the cable network includes accessing a docsIf31CmtsCmRegStatusDsProfileIdList.

29. The non-transitory computer-readable media of claim 22, wherein discovering a current set of profiles for the cable network includes generating a topology mapping between a specific OFDM channel ifIndex and downstream channel Id (DCID).

30. The non-transitory computer-readable media of claim 22, the method including:
channelizing subcarriers of each of the OFDM channels into bands of subcarriers;
wherein obtaining the signal quality values for the plurality of OFDM subcarriers includes mapping a MER value to each of band of subcarriers.

31. The non-transitory computer-readable media of claim 30, wherein each band is 6 MHz.

* * * * *